United States Patent
El Kaed et al.

(10) Patent No.: US 11,526,510 B2
(45) Date of Patent: Dec. 13, 2022

(54) SEMANTIC SEARCH METHOD FOR A DISTRIBUTED DATA SYSTEM WITH NUMERICAL TIME SERIES DATA

(71) Applicant: SCHNEIDER ELECTRIC USA, INC., Andover, MA (US)

(72) Inventors: Charbel Joseph El Kaed, New York City, NY (US); Imran Khan, Province Isere (FR); Hicham Hossayni, Province Isere (FR)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 16/765,508

(22) PCT Filed: Nov. 20, 2018

(86) PCT No.: PCT/US2018/062082
§ 371 (c)(1),
(2) Date: May 20, 2020

(87) PCT Pub. No.: WO2019/104077
PCT Pub. Date: May 31, 2019

(65) Prior Publication Data
US 2020/0334253 A1  Oct. 22, 2020

Related U.S. Application Data

(60) Provisional application No. 62/589,297, filed on Nov. 21, 2017.

(51) Int. Cl.
*G06F 16/00* (2019.01)
*G06F 16/2452* (2019.01)
(Continued)

(52) U.S. Cl.
CPC .... *G06F 16/24526* (2019.01); *G06F 16/2477* (2019.01); *G06F 16/36* (2019.01); *G06F 17/18* (2013.01)

(58) Field of Classification Search
CPC .......... G06F 16/24526; G06F 16/2477; G06F 16/36; G06F 17/18
See application file for complete search history.

(56) References Cited

U.S. PATENT DOCUMENTS 6,263,342 B1  7/2001  Chang et al.
8,260,842 B1  9/2012  Zaretzky et al.
(Continued)

FOREIGN PATENT DOCUMENTS

WO  WO-2015003063 A1 *  1/2015 ........... G06F 16/245
WO  2015164359 A1  10/2015
WO  2017173104 A1  10/2017

OTHER PUBLICATIONS

Henson, C. et al. "An Ontological Representation of Time Series Observations on the Semantic Sensor Web." (2009). (Year: 2009).*

(Continued)

*Primary Examiner* — Syed H Hasan
(74) *Attorney, Agent, or Firm* — Lando & Anastasi, LLP

(57) ABSTRACT

Methods and systems are provided for searching time series information in a distributed data processing system. A method of processing a semantic search query comprises receiving a structured search query, processing the structured search query to deconstruct into query elements, identifying a set of connected elements based on the query elements, processing a time series data structure of the identified set of connected elements to determine a command data element, utilizing the command data element to process the time series data structure of the identified set of connected elements, annotating the time series data structure (Continued)

of each of the identified set of connected elements to form a queried data set, and providing the queried data set.

18 Claims, 17 Drawing Sheets

(51) Int. Cl.
*G06F 16/2458* (2019.01)
*G06F 16/36* (2019.01)
*G06F 17/18* (2006.01)

(56) References Cited

U.S. PATENT DOCUMENTS

| | | | |
|---|---|---|---|
| 8,442,917 B1 | 5/2013 | Burke | |
| 9,483,735 B2* | 11/2016 | Chen | G06N 5/025 |
| 2005/0289124 A1 | 12/2005 | Kaiser et al. | |
| 2006/0248058 A1 | 11/2006 | Feng | |
| 2010/0153088 A1 | 6/2010 | Kim et al. | |
| 2011/0077758 A1* | 3/2011 | Tran | G16H 40/67 |
| | | | 700/94 |
| 2011/0196852 A1 | 8/2011 | Srikanth et al. | |
| 2012/0197911 A1 | 8/2012 | Banka et al. | |
| 2012/0290230 A1* | 11/2012 | Berges Gonzalez | |
| | | | G05B 19/0428 |
| | | | 702/61 |
| 2012/0310417 A1* | 12/2012 | Enohara | G06K 9/00771 |
| | | | 700/276 |
| 2013/0311146 A1 | 11/2013 | Miller et al. | |
| 2014/0108019 A1 | 4/2014 | Ehsani et al. | |
| 2014/0316743 A1* | 10/2014 | Drees | G05B 15/02 |
| | | | 702/183 |
| 2015/0134585 A1* | 5/2015 | Chen | G05B 15/02 |
| | | | 706/48 |
| 2015/0286969 A1 | 10/2015 | Warner et al. | |
| 2015/0339346 A1* | 11/2015 | Berchtold | G05B 13/04 |
| | | | 707/722 |
| 2016/0350364 A1 | 12/2016 | Anicic et al. | |
| 2017/0284691 A1 | 10/2017 | Sinha et al. | |
| 2018/0232422 A1* | 8/2018 | Park | G05D 23/1931 |
| 2018/0341255 A1* | 11/2018 | Turney | G05B 23/0294 |
| 2018/0373753 A1 | 12/2018 | Flaks | |
| 2020/0082037 A1* | 3/2020 | Zhang | G06F 30/33 |

OTHER PUBLICATIONS

Lucélia de Souza et al., "Domain Ontology For Time Series Provenance." (2014). (Year: 2014).*
Hyun Lyunsik et al: "A System for the Specification and Execution of Conditional WoT Applications over Voice", Proceedings of the Posters and Demos Session of the 16th International Middleware Conference on, Middleware Posters and Demos '15, Dec. 7, 2015 (Dec. 7, 2015), pp. 1-2, XP055774292, New York, New York, USA, DOI: 10.1145/2830894.2830895, ISBN: 978-1-4503-3729-8, Retrieved from the Internet: URL:https://dl.acm.org/doi/pdf/10.1145/2830894.2830895.
Mccauley Robert: "Using Alexa Skills Kit and AWS IoT to Voice Control Connected Devices", May 3, 2016 (May 3, 2016), XP055776265, [retrieved on Feb. 15, 2021].
Anonymous: "AWS IoT Developer Guide", Sep. 30, 2015 (Sep. 30, 2015), XP055441481, Retrieved from the Internet: URL:https://raw.githubusercontent.com/SeeedDocument/Beagle_Bone_Green_and_Grove_IoT_Starter_Kit_Powered_by_AWS/ master/res/AWS_IoT_Developer _Guide.pdf [retrieved on Jan. 16, 2018].
Datta Soumya Kant et al: "oneM2M Architecture Based User Centric IoT Application Development", 2015 3rd International Conference on Future Internet of Things and Cloud, IEEE, Aug. 24, 2015 (Aug. 24, 2015), pp. 100-107, XP032798274, DOI: 10.1109/FICLOUD.2015.7 [retrieved on Oct. 19, 2015].
Gyrard Amelie et al : "A Semantic Engine for Internet of Thi ngs: Cl oud, Mobile Devices and Gateways", 2015 9th International Conference on Innovati ve Mobile and Internet Services in Ubiquitous Computing, IEEE, Jul. 8, 2015 (Jul. 8, 2015), pp. 336-341, XP033221515, DOI: 10.1109/IMIS.2015.83 [retrieved on Sep. 30, 2015].
Li Hongkun et al : "Enabling Semantics in an M2M/IoT Serviice Delivery Platform", 2016 IEEE Tenth International Conference on Semantic Computing (ICSC), IEEE, Feb. 4, 2016 (Feb. 4, 2016), pp. 206-213, XP032886254, DOI: 10.1109/ICSC.2016.28 [retrieved on Mar. 22, 2016].
Martin Bauer et al: "Semantic Interoperability for the Web of Things", , Aug. 27, 2016 (Aug. 27, 2016), XP055441479, DOI: 10.13140/RG.2.2 .25758.13122 Retrieved from the Internet: URL:https://www.researchgate.n <http://www.researchgate.net/profile/Paul>et/profile/Paul <http://www.researchgate.net/profile/Paul>_Murdock/publication/307122744_Semantic_Interoperability_for_the_Web_of_Things/links/57c1df6008aeda1 ec38cf5f5/Semantic -Interop erability-for-the-Web-of- Things.pdf [retrieved on Jan. 16, 2018].
Notification of Transmittal of the International Search Report and the Written Opinion of the International Searching Authority from corresponding PCT/US2018/062082 dated Feb. 28, 2019.
Richard Mietz et al: "Semantic Models for Scalable Search in the Internet of Things", Journal of Sensor and Actuator Networks, vol. 2, No. 2, Mar. 27, 2013 (Mar. 27, 2013), pp. 172-195, XP055441482, DOI: 10.3390/jsan2020172.
Young -Guk Ha et al: "Automated Teleoperation of Web-Based Devices Using Semantic Web Services", Jun. 22, 2005 (Jun. 22, 2005), Innovations in Appli ed Artificial Intelligence; [Lecture Notes in Computer Science; Lecture Notes in Artificial Intelligence; LNCS ], Springer-Verlag, Berlin/Heidelberg, pp. 185-188, XP019011498, ISBN: 978-3-540-26551-1.

* cited by examiner

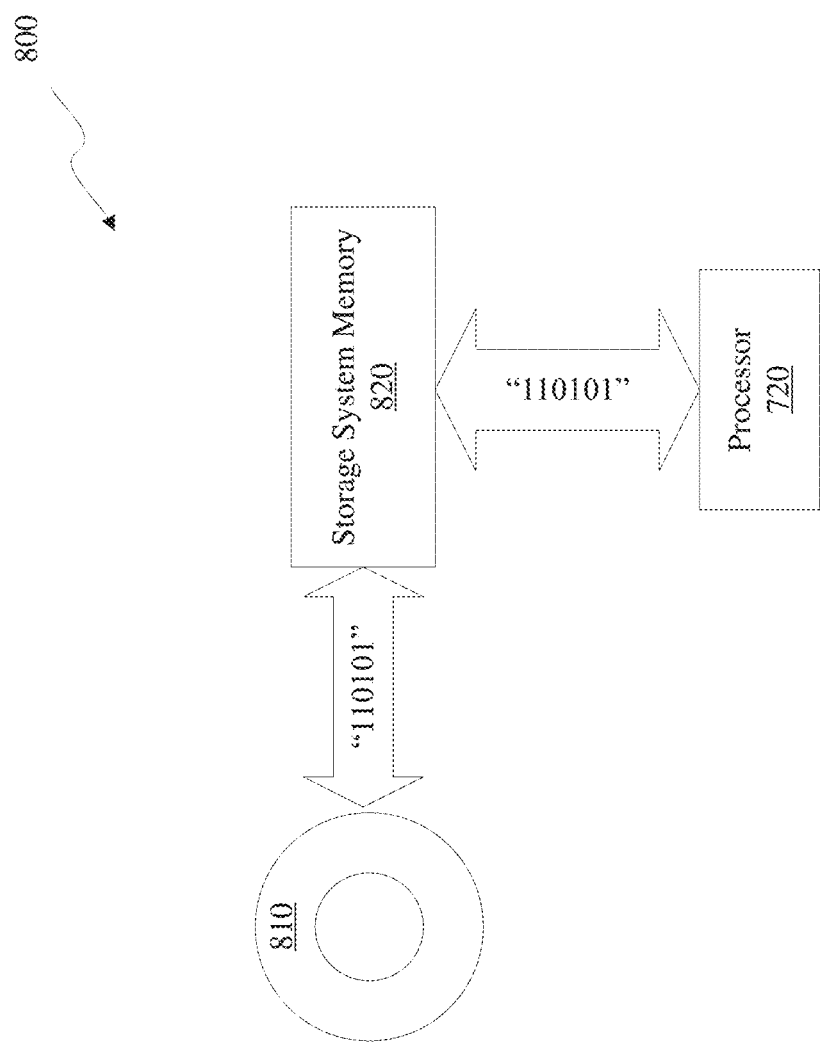

SEMANTIC SEARCH METHOD FOR A DISTRIBUTED DATA SYSTEM WITH NUMERICAL TIME SERIES DATA

CROSS-REFERENCE TO RELATED APPLICATION

This application is a U.S. National Stage Application under 35 U.S.C. § 371 of International Application No. PCT/US2018/062082, filed Nov. 20, 2018, titled SEMANTIC SEARCH METHOD FOR A DISTRIBUTED DATA SYSTEM WITH NUMERICAL TIME SERIES DATA, which claims the benefit under 35 U.S.C. § 119(e) of U.S. Provisional Application No. 62/589,297, filed Nov. 21, 2017, titled SEMANTIC SEARCH METHOD FOR A DISTRIBUTED DATA SYSTEM WITH NUMERICAL TIME SERIES DATA, both of which are hereby incorporated by reference in their entireties for all purposes.

PRIORITY CLAIM

This application claims priority to and benefit from the following provisional patent application: U.S. Provisional Application Ser. No. 62/589,297 titled "Semantic Search Method For A Distributed Data System With Numerical Time Series Data" filed on Nov. 21, 2017. The entire contents of this aforementioned patent application are expressly incorporated by reference herein.

BACKGROUND

Field of the Invention

Embodiments of the present disclosure relate generally to methods of data processing, and more specifically to systems and methods for querying data associated with a distributed data processing system.

Description of the Related Art

The Internet of Things (IoT) promises to interconnect elements together on a massive scale. Such amalgamation allows interactions and collaborations between these elements in order to fulfill one or more specific tasks. Such tasks differ according to the context and environment of application. For example, tasks may range from sensing and monitoring of an environmental characteristic such as temperature or humidity of a single room to controlling and optimization of an entire building or facility in order to achieve a larger objective such as an energy management strategy.

Depending on the application, connected elements may be of heterogeneous and/or homogenous hardware which may facilitate sensing, actuation, data capture, data storage, or data processing. Each type of connected element hardware may have a unique data structure which details a digital representation of the physical capabilities of the hardware itself and/or measured parameters. For example, a temperature sensor may include temperature measurement, MAC address, IP address, and CPU type data. Each connected hardware element may possess a unique data structure. Accordingly, with the heterogeneity of these various data structures available through the wide variety of available hardware, efficiently analyzing this data becomes a serious challenge.

SUMMARY

Methods and systems are provided for searching time series information in a distributed data processing system. A method of processing a semantic search query comprises receiving a structured search query, processing the structured search query to deconstruct into query elements, identifying a set of connected elements based on the query elements, processing a time series data structure of the identified set of connected elements to determine a command data element, utilizing the command data element to process the time series data structure of the identified set of connected elements, annotating the time series data structure of each of the identified set of connected elements to form a queried data set, and providing the queried data set.

Principles of the disclosure contemplate where the structured search query is configured with a particular grammar, or the particular grammar includes query elements that facilitate filtering, aggregation, publish, subscribe, and/or inferential functions.

Further embodiments contemplate where the defined data source is filtered for a data field associated with one or more connected elements, or wherein the associated filtered data fields selected from a group including device type, class, capability, or communication protocol, or, where the defined data source is aggregated using a mathematical operation.

Additional embodiments contemplate, the mathematical operations may include min, max, sum, or average, or where the defined data source is published or subscribed for connected elements, the defined data source infers relationships between connected elements, or that inferring relationships between connected elements is determined by time series operations.

BRIEF DESCRIPTION OF THE DRAWINGS

These accompanying drawings are not intended to be drawn to scale. In the drawings, each identical or nearly identical component that is illustrated in various figures is represented by a line numeral. For purposes of clarity, not every component may be labeled in every drawing. In the drawings:

FIG. 8 is a functional block diagram of a general-purpose storage system in accordance with the general-purpose computer system of FIG. 7.

DETAILED SUMMARY

Figure 1A:
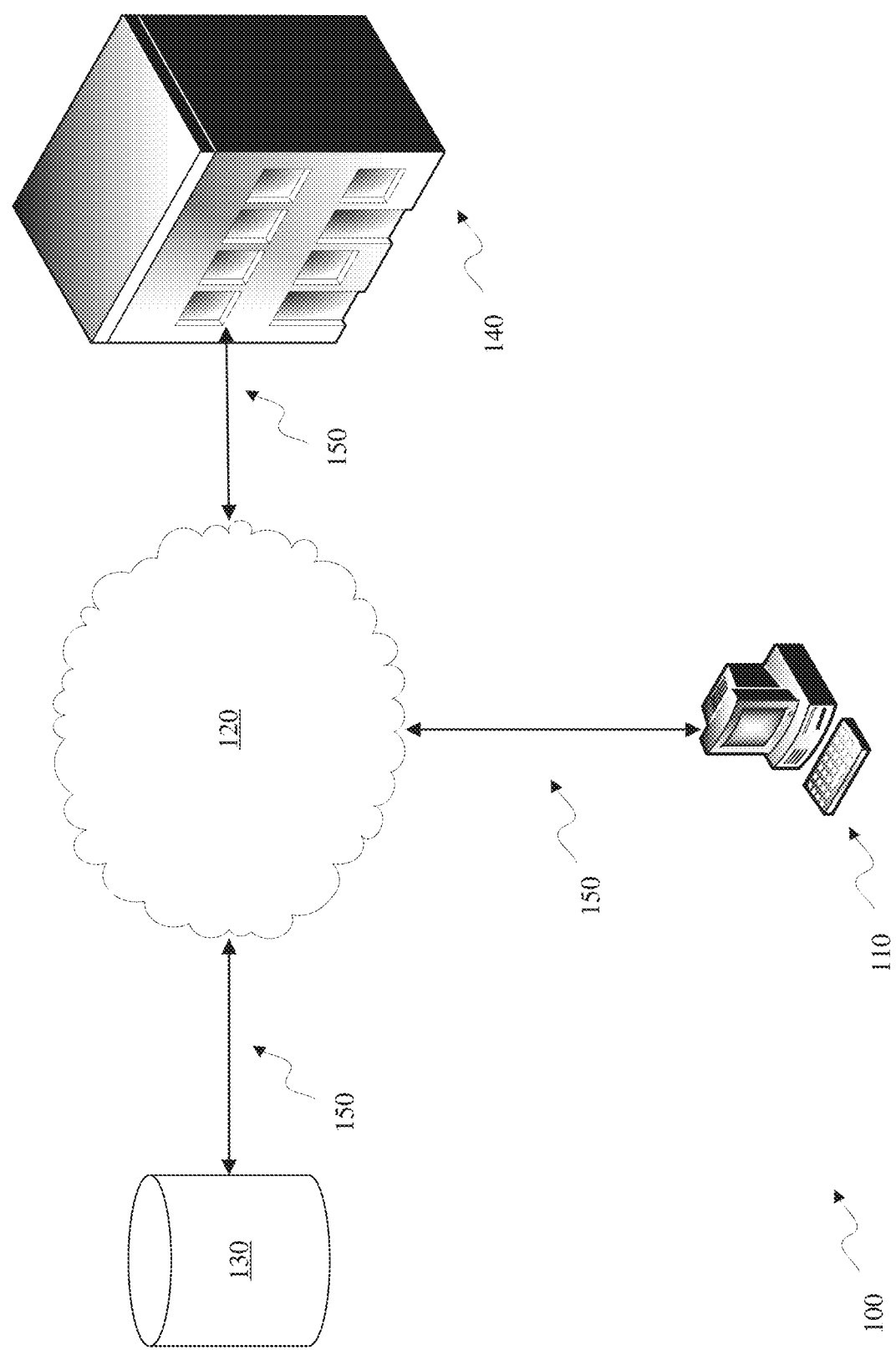
FIG. 1A illustrates aspects of a system for facilitating a semantic search method utilizing time series data in accordance with various embodiments of this disclosure.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e. "including but not limited to."

In the emerging world of the Internet of Things (IoT) or more generally, Cyber Physical Systems (CPS), a convergence of multiple technologies is underway to allow the sensing, actuation, data capture, storage, or processing from a large array of connected elements. These connected elements may be accessed remotely using existing network infrastructure to allow for efficient Machine to Machine (M2M) and Human to Machine (H2M) communication. During this communication, as the network of connected elements changes over time, an increasing amount of data from these connected elements will be generated and allow for correlations which have not been possible before. Issues of organizing dynamic sets of connected elements are exacerbated by the disparate heterogeneous nature of the associated data structures.

With this plethora of hardware and associated data structures, a problem of organizing and analysis of data emerges as a wide variety of data structures may be received at a single processing point from the vast network of connected elements. A need exists for the ability to process, request, and analyze data from heterogeneous sources from the connected elements. Each individual connected element may contain multiple data characteristics from a data structure that are similar to other individual or group of elements. Yet, even with these similar data characteristics, efficiently querying for these similar data characteristics across the plethora of different connected elements is a significant challenge. One method to solve this problem of data heterogeneity involves the implementation and execution of structured semantic queries.

A solution to the data challenge is the use of structured semantic queries that solves two distinct problems. First, is to solve the issue of data heterogeneity delivered from a connected system which contains various data structures. Second is to filter and aggregate this heterogeneous data from the connected elements and provide only required and relevant data to a user, cloud platform, or other repository. These solutions may be executed now utilizing time series data (as opposed to ontological data) which is widely available. Utilizing these systems and methods, a user may transform time series data into ontological content.

Example applications of implementation and execution may include, but are not limited to: (1) managing HVAC systems to assure the comfort of facility occupants, (2) maintenance of a particular environmental air quality (which may consist of temperature, humidity, and carbon dioxide content) for storage or occupants and dynamically adjusting a working building environment according to the prevailing weather conditions, (3) manage a facility management through controlling and optimizing regarding energy consumption through active control of lighting, heating, and cooling, and (4) monitor day to day operations, maintenance, and oversight of facility operations. Commercial embodiments of such applications may be a part of building management or automation system.

It is to be understood that the system described herein facilitates significant flexibility in terms of configuration and/or end user application and that although several examples are described a number of alternative embodiment configurations and applications are also possible.

Generally, such tasks are performed by individuals who are relatively non-technical in nature and require a rich interactive experience which hides the complexity of the data heterogeneity problem. Advantages of the various embodiments contained herein include; allowing for the search of specific connected elements or associated data structures; configuring of alerts and notification messages adhering to a facility specific architecture without intimate knowledge of same; allowing for execution of facility specific queries to determine real-time metrics such as energy consumption by area; and configuring any type of data structure to collect in a manner that does not require translation of units or other specific constructs.

FIG. 1A illustrates a representation of a system for implementation and execution of a semantic search method 100 in which various embodiments of the present disclosure may be implemented. The system for a semantic search method may include one or more general purpose computers 110, one or more data storage arrays 130, a cloud computing environment 120, a building or other structure 140 which contains one or more connected elements (not shown), and network connections 150 to allow the exchange of data between these parts of the system.

In one embodiment of the system illustrated in FIG. 1A, the building 140 contains one or more connected elements that perform sensing, actuation, data capture, storage, or processing for the monitoring or management of the building 140. Any variety of connected elements may be used to capture, store, or process data, or actuate associated devices over the network connections 150, to the cloud computing environment 120, to other parts of the system. These connected elements may, for example, detect temperature, humidity, ambient light, sound, smoke, carbon monoxide, carbon dioxide, motion, non-conductive fluids, conductive fluids, vibration, energy, power, voltage, current, or any other desired characteristic, and combination thereof. Connected elements may also operate or articulate elements, components, and/or other systems such as turning on lights, opening a door or window, moving window shades, or triggering a door lock. Connected elements may also process data structures from other connected elements or propagate data structures from one or more connected elements to one or more other connected elements. Any number of connected elements may be deployed in any combination to monitor or manage a physical space. Examples of such a space may include a closet, room, building, campus, office, promenade, or any other desired location.

Each building 140 containing a connected element may ultimately connect to a cloud-computing environment 120 through a network connection 150. This connection allows access to the cloud computing environment 120 by a variety of devices capable of connecting to such an environment in either a wired or wireless connection manner. From FIG. 1A such devices may include one or more general-purpose computers 110 capable of receiving input from a user or to provide autonomous operation. One or more data storage arrays 130 may be utilized to provide additional data storage capability. It should be appreciated a cloud computing environment 120, while providing additional communication paths to additional elements or systems, is not required as part of the semantic search method. Other embodiments contemplate self-contained or stand-alone systems.

The network connections 150 may be wired or wireless connection types. Such connections may include, but are not limited to, any physical cabling method such as category 5 cable, coaxial, fiber, copper, twisted pair, or any other physical media to propagate electrical signals. Wireless connections may include, but are not limited to personal area networks (PAN), local area networks (LAN), Wi-Fi, Bluetooth, cellular, global, or space based communication networks. Access between the cloud environment 120 and any other cloud environment is possible in other implementations these other cloud environments are configured to connect with devices similar to cloud environments such as the existing cloud environment 120. It is to be understood that the computing devices shown in FIG. 1A are intended to be illustrative only and that computing nodes and cloud computing environments may communicate with any type of computerized device over any type of network with addressable or direct connections.

Figure 1B:
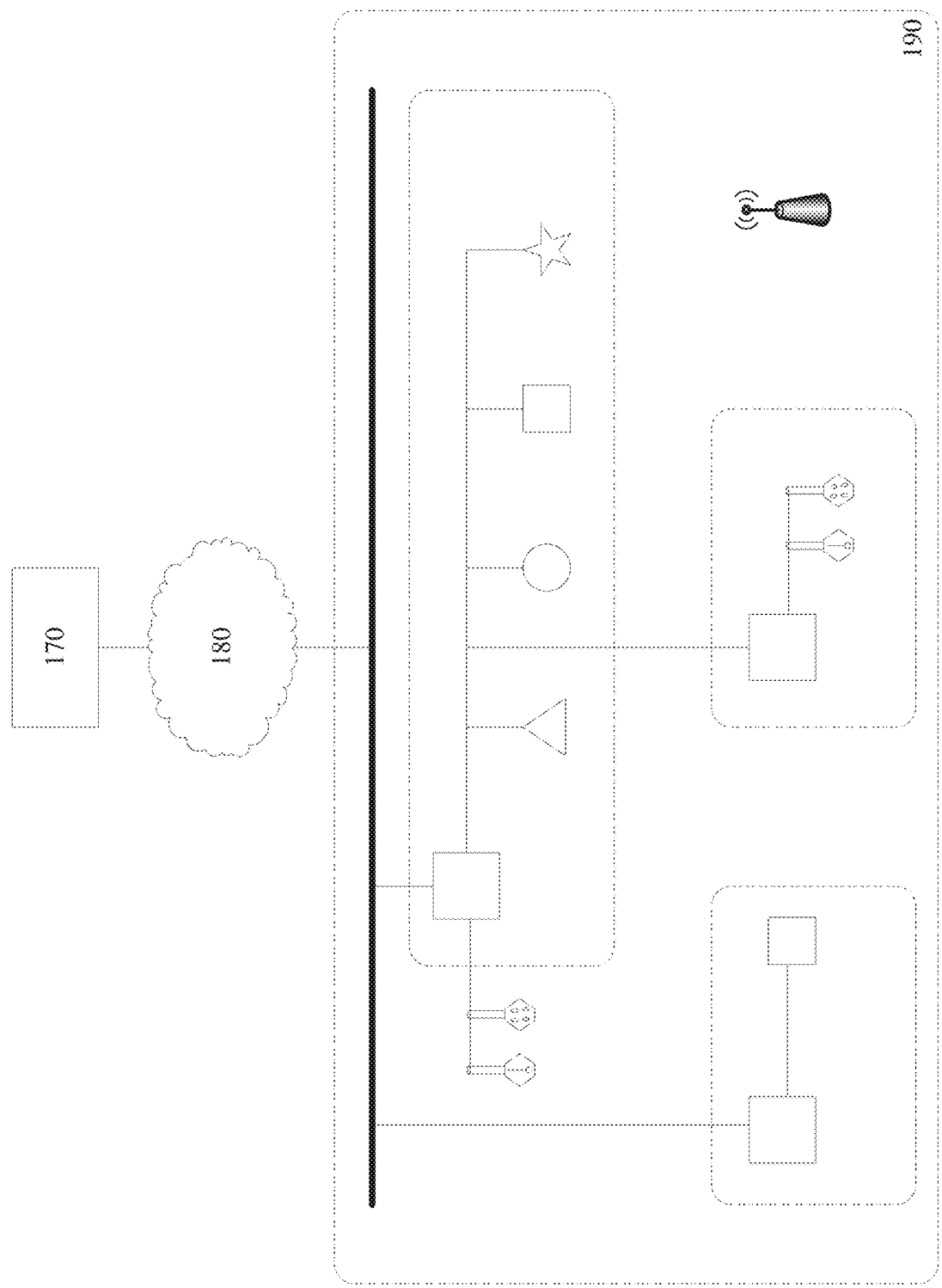
FIG. 1B illustrates another embodiment of aspects of a system for facilitating a semantic search method utilizing time series data illustrated in FIG. 1A.

FIG. 1B illustrates other embodiments of aspects of a system for facilitating a semantic search method illustrated in FIG. 1A. Such embodiments may have one or more general purpose computers operating an application specific program 170 to act as a management system which may be connected wired or wireless to a cloud computing environment 180, which in turn may be connected to one or more building environments 190. Areas in each building environment 190 may contain one or more connected elements. These connected elements may, for example, detect temperature, humidity, ambient light, sound, smoke, carbon monoxide, carbon dioxide, motion, non-conductive fluids, conductive fluids, vibration, energy, power, voltage, current, or any other desired characteristic, and combination thereof. Connected elements may also operate or articulate elements, components, and/or other systems such as turning on lights, opening a door or window, moving window shades, or triggering a door lock and ultimately report data back to the application specific program 170 acting as a management system.

Figure 2:
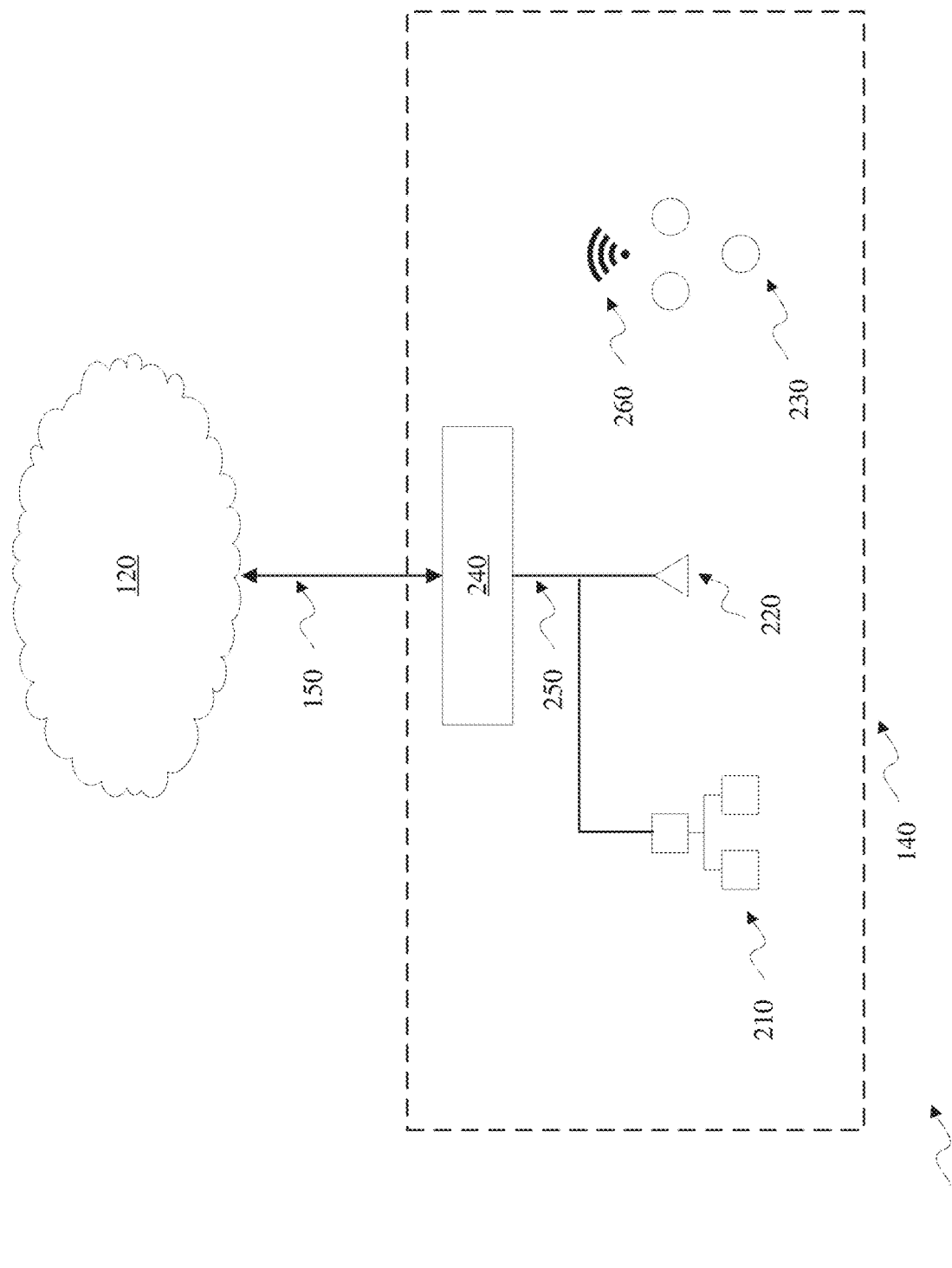
FIG. 2 illustrates aspects of how different types of devices may connect to the system for facilitating a semantic search method utilizing time series data in accordance with various embodiments of this disclosure.

FIG. 2 illustrates a representation of a portion of the system for a semantic search method 200 in which various embodiments of the present disclosure may be implemented. In one embodiment of FIG. 2, the building 140 contains one or more types of connected elements 210, 220, 230, 240 for the monitoring or management of the structure. These connected elements 210, 220, 230, 240 communicate via a wired 250 or wireless 260 networks and makes the data structures from each connected element available to the cloud environment 120 via the network connections 150.

Any variety of connected elements may be used to perform sensing, actuation, data capture, storage, or processing over the network connection 150, to the cloud computing environment 120, to other parts of the system. For example, connected elements may be connected sensors to measure carbon dioxide 210 for monitoring air quality of the building 140 and communicate via a wired network connection 250. Connected elements may be both a connected sensor to detect ambient light and also an actuator 220 to change the state of an occupant light fixture and communicate via a wired network connection 250. Connected elements may be connected sensors for temperature and humidity 230 to monitor environment of the building 140 and communicate via a wireless network connection 260. Finally, connected element 240 serves as a connected gateway to communicate with the associated connected elements 210, 220, 230, via their respective network connections 250, 260, process the data structures of each, and transmit same to a network connection 150 for transmission to the cloud environment 120. It should be appreciated a cloud computing environment 120, while providing additional communication paths to additional devices or systems, is not required as part of the semantic search method. Other embodiments contemplate self-contained or stand-alone systems.

These connected elements need not be geographically localized or logically grouped in any way to utilize embodiments of this disclosure. Grouping connected elements geographically or logically may allow more economic use. A geographic grouping such as in an apartment, home or office building may be accomplished, as well as logically locating connected elements by function. One of many logical grouping examples may be locating connected end points designed to sense temperature, proximate to an occupied location to detect changes in environment. It should be appreciated that the groupings of connected endpoints may also be located on a very large geographic scale, even globally. Such global operations may be monitored through a network located in any number of facilities around the globe.

Figure 3A:
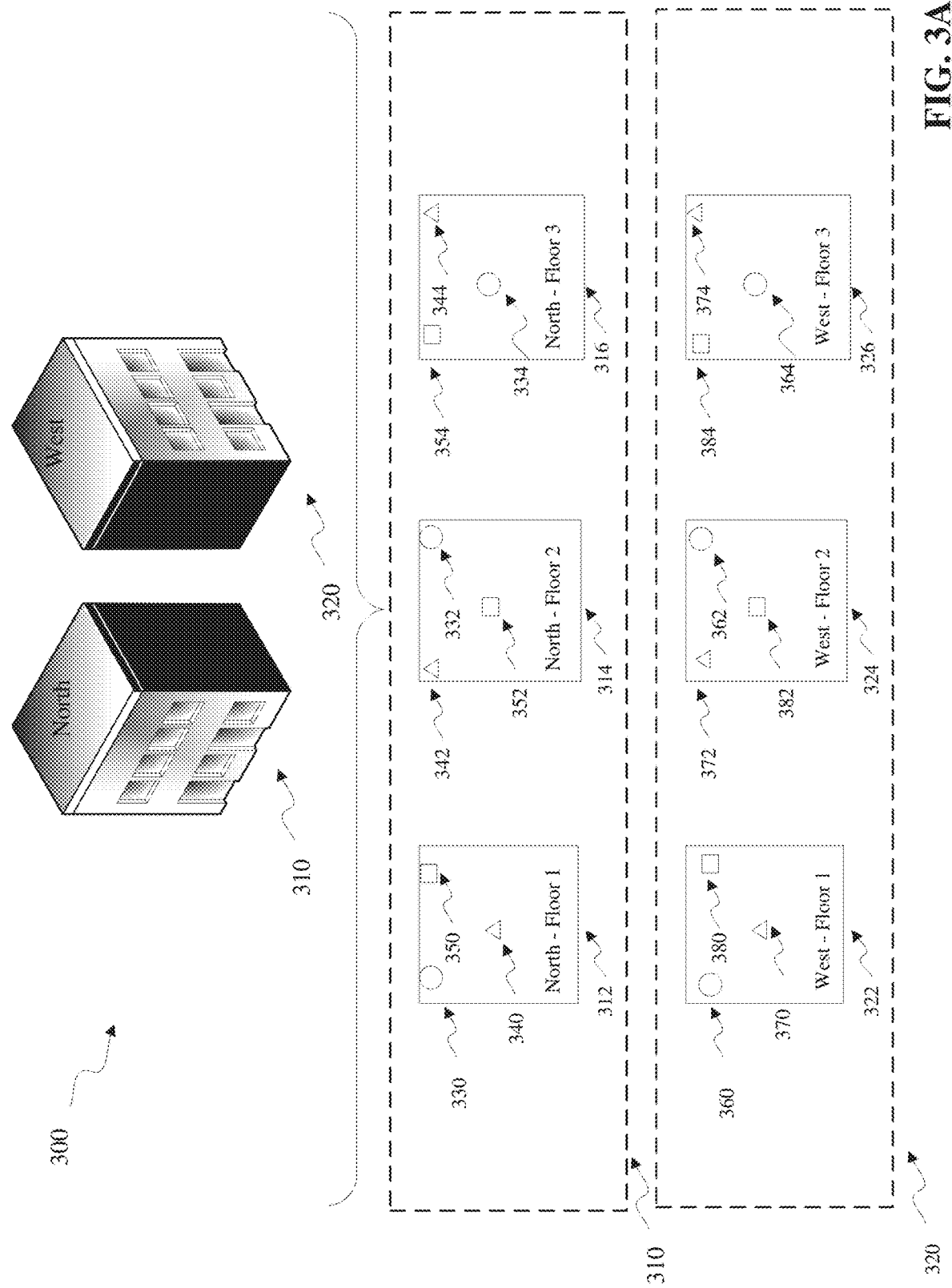
FIG. 3A illustrates an exemplary deployment of various connected elements of the system for facilitating a semantic search method utilizing time series data in accordance with various embodiments of this disclosure.

FIG. 3A illustrates exemplary deployment in context of various elements of the system for a semantic search method 300 in which various embodiments of the present disclosure may be implemented. A "North" building 310 and a "West" building 320 are illustrated. Each building has (3) floors associated with each. North Floor (1) 312, North Floor (2) 314, North Floor (3) 316 are contained within the North building 310. West Floor (1) 322, West Floor (2) 324, and West Floor (3) 326 are contained within the West building 320. Each floor has (3) connected elements of different types. For example, connected elements may be connected sensors to measure carbon dioxide 330, 332, 334, 360, 362, 364 for monitoring air quality of the building 310, 320 respectively and communicate via a wired network connection. Connected elements may be both a connected sensor to detect ambient light and an actuator 340, 342, 344, 370, 372, 374 to change the state of an occupant light fixture and communicate via a wired network connection. Connected elements may be connected sensors for temperature and humidity 350, 352, 354, 380, 382, 384 to monitor environment of the building 310, 320 respectively and communicate via a wireless network connection.

Figure 3B:
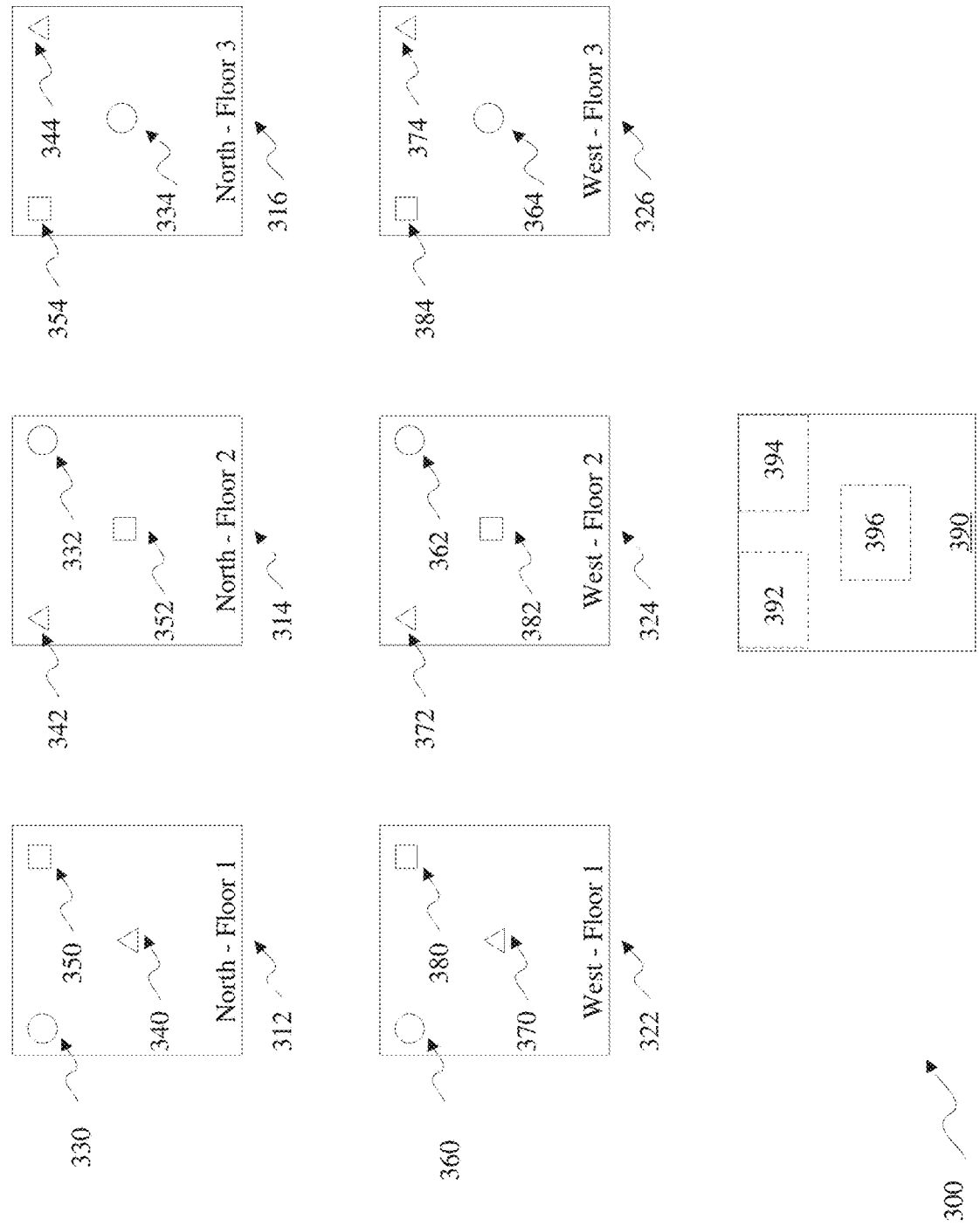
FIG. 3B illustrates exemplary deployment of connected elements across a variety of physical locations of the system that facilitates a semantic search utilizing time series data from FIG. 3A.

FIG. 3B illustrates exemplary deployment in context and logical placement of various elements system for a semantic search method 300 in which various embodiments of the present disclosure may be implemented. Within each floor of each building multiple connected elements exist. As an example, temperature and humidity 350, 352, 354, 380, 382, 384 carbon dioxide 330, 332, 334, 360, 362, 364, and ambient light 340, 342, 344, 370, 372, 374 connected elements exist on each floor of each building. Further, each connected element may exist in a distinct zone on each floor of each building. As one of many examples, a general floor plan 390 may indicate zones that are defined as "Zone 1" 392, "Zone 2" 394, and "Zone 3" 396. It should be appreciated that such designations are highly configurable by a user or other system and are shown here for illustrative purposes only.

Given the connected element configuration illustrated in FIGS. 3A and 3B, each connected element possesses a data structure that includes, but not be limited to, sensor specific information (temperature/humidity, carbon dioxide, and ambient light), geographic information (zone, floor, building), and network information (MAC address, IP address, wired, wireless). Other connected element information may be available as well as information relative to the operation of the connected element itself. As one example, a status of online or offline may be available to further add to the data construct for each connected element.

Once physical connections to the connected elements are put in place or established, a digital representation may be created. This process of translating the physical representation of the system to a homogenized taxonomy called semantic tagging. Semantic tagging links the data structures available from the connected elements of a particular system to a formal naming and definition that actually or possibly exist in physically represented systems, or ontology. For example, ontologies may include definitions such as location, relationships, usage, physical quantities, network protocol, or units.

Semantic tagging may occur in one of two ways, automatic or manual semantic tagging. Automatic semantic tagging is accomplished by the system without user input. In this approach, each data structure for each connected element is examined and deconstructed by the system into corresponding data structure elements. During the identification process, it is determined what data structure elements exist for each connected element. Once each data structure element is defined, it is then mapped to a corresponding taxonomy and tagged with this taxonomy which in turn becomes part of that connect elements data structure. At least one data structure elements may be tagged during this process to allow all connected elements to be defined as part of the system.

Manual semantic tagging is accomplished by the system with user input. As an example, this form of tagging may be performed during the installation of the system as whole, groups of connected elements, or individual connected elements. Similar to automatic semantic tagging each data structure for each connected element is examined or known to a user. Once the user identifies what data structure element is defined, a user may then select a mapping to a corresponding taxonomy. Once tagged with this taxonomy it in turn becomes part of that connected elements data structure. At least one data structure elements may be tagged during this process to allow all connected elements to be defined as part of the system. Other tools may be available to assist the user in identification of the particular data structure elements for the particular connected elements. Such tools may be used during commissioning of the entire system or portions of the system.

Figure 3C:
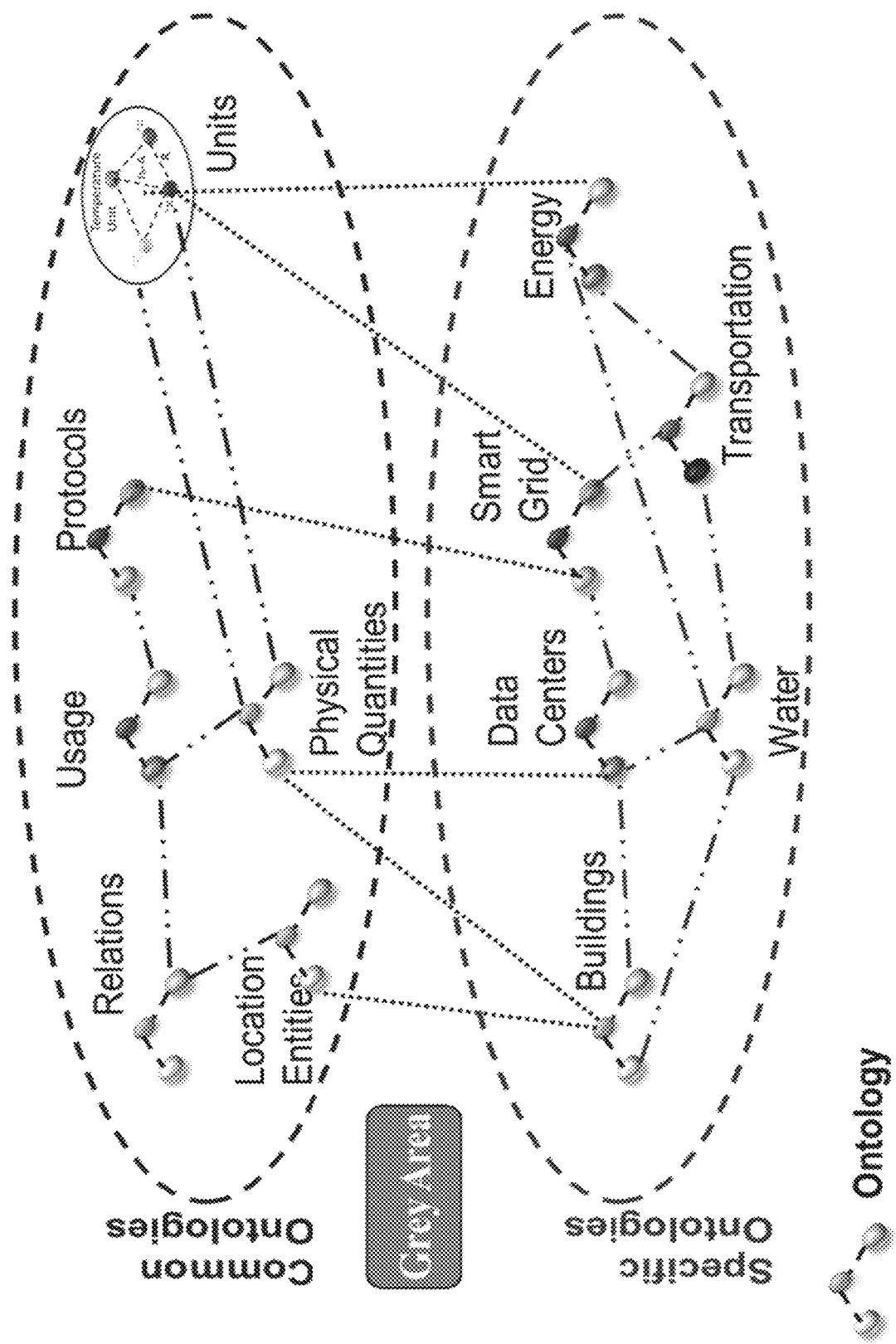
FIG. 3C illustrates exemplary data organization constructs of connected elements across a system that facilitates a semantic search utilizing time series data.
Figure 3D:
FIG. 3D illustrates exemplary data organization constructs within a user interface of connected elements across a system that facilitates a semantic search utilizing time series data.

FIG. 3C illustrates exemplary data organization constructs of connected elements across a system that facilitates a semantic search. It should be appreciated that any connected element type in any combination may exist in any geographic location and include additional information within a respective data structure. These exemplary data organization illustrates examples of ontologies such as protocols or usage as well as ontologies specific to the application such as data center or buildings. FIG. 3D illustrates exemplary output from a user interface which may be used to facilitate manual semantic tagging.

Once the process of semantic tagging is completed, a digital representation of the physical system is stored in one or more memory within the system. Each connected element will be represented by a corresponding data structure. Each data structure will contain data structure elements that describe the characteristics of the connected element. As one of many examples, the connected element possessing a carbon dioxide sensor 330, will possess an associated data structure describing the characteristics of the sensor. Each data structure will be composed of a number of data structure elements. Each connected element will possess a data contracture and one or more data structure elements. Data structure elements for this carbon dioxide sensor 330 may include, physical quantities (carbon dioxide), measured units (Parts Per Million), location (North Building, Floor 1, Zone 3), protocol (MODBUS), network (wired, IP address), and usage (buildings).

It should be appreciated that while each connected element will have an associated data structure, the number of data structure elements may vary based on the particular configuration or application. Once the connected elements data structures are organized in this way, multi-dimensional analysis may be performed without discrete or in-depth knowledge of the physical system and the associated connected elements.

Figure 4A:
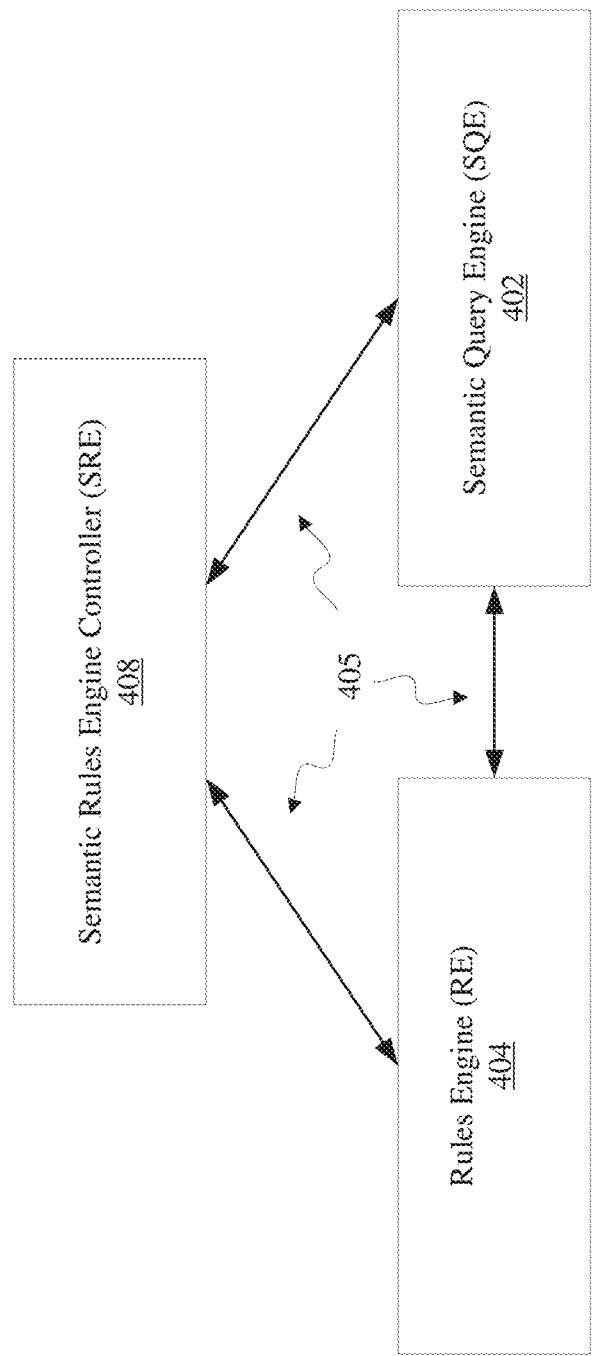
FIG. 4A is a block diagram of components and interconnections for a semantic search method utilizing time series data in accordance with various embodiments of this disclosure.

FIG. 4A is a block diagram of components and interconnections of a time series based semantic search method. In one embodiment the system contains a semantic engine 402 and a rules engine 404, each is described in context in detail herein. It should be appreciated the semantic engine 402 and a rules engine 404 are in communication via network connections 405 both with each other and with the system itself. It is through this closely bound communication that the semantic engine 402 obtains results for the rules engine 404 to effectuate. Further results from the rules engine 404 are used to effectuate semantic queries used at the semantic engine 402. It should be appreciated this is more than a passing of results from one portion of the system to another, but rather an interrelation between them which facilitates many of the benefits described herein.

A semantic rule engine controller may be comprised of two parts, a rule engine and semantic engine. While both may be used in conjunction with each other, it should be appreciated this is not a limitation of the system and one or both may be used independent of the other.

A semantic rule engine controller 408 may include the following features: (1) utilize operational rules to explicitly express user and/or system requirements and conditions in an unambiguous and contextual manner; (2) utilize the capability of a device (e.g. a gateway) to deploy operational rules either locally and/or remotely; (3) dedicated operational rules execution engine to analyze, create, and/or execute the operational rules; (4) utilize SemanticWeb and Ontology concepts to provide consistent, reusable and shareable views regarding the data; (5) query language which is contextual with a natural language-like grammar; (6) an efficient mechanism to analyze user and/or system queries; (7) develop a solution in a modular way to integrate and extend with new functionality in the future.

With the semantic rule engine controller 408 any user and/or system requirements, regarding control or information, are expressed in the form of operational rules. These rules are designed so that they are able to: (1) evaluate conditions related to resources and/or their capabilities; (2) perform control of resources and/or capabilities when these conditions are met; (3) notify a user and/or system when a certain condition has been met; (4) provide a life-cycle to each rule that allows the rule to be installed, activated, deactivated, and/or uninstalled; (5) cooperation between rules allowing for, in one example, multiple rules to reuse the same articulation definition.

Figure 4B:
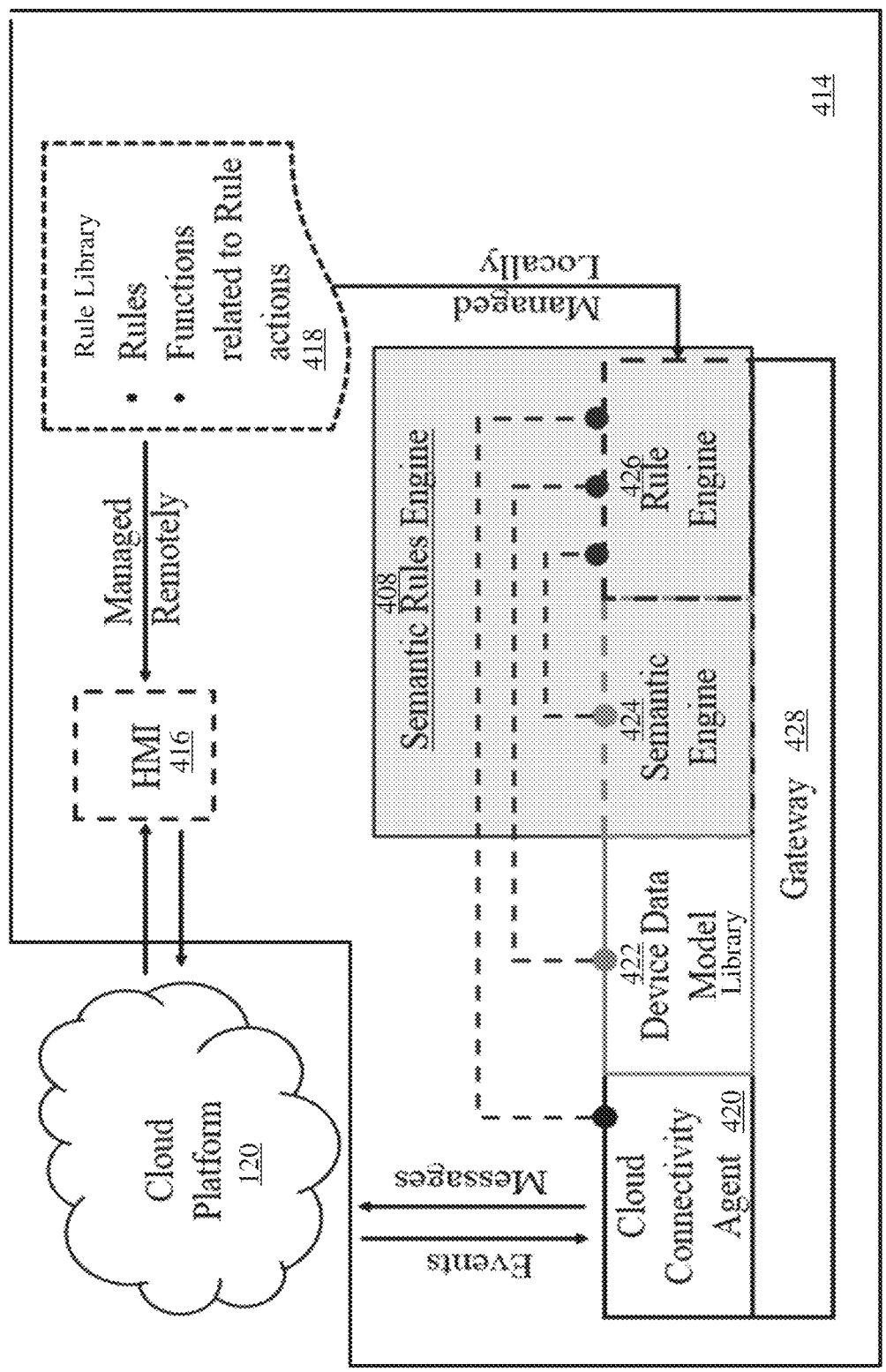
FIG. 4B is a block diagram of various embodiments of components and interconnections of the system for a semantic search method utilizing time series data in accordance with various embodiments of this disclosure.

FIG. 4B is a block diagram of an embodiment of components of the system. In the present example a time series based semantic search system 414 consists of a Human Machine Interface (HMI) 416, a rule library 418, cloud connectivity agent 420, device data model library 422, gateway 428, and a semantic rule engine controller 408 which itself consists if a semantic engine 424 and rule engine 426. A cloud platform 120 may also be present to effectuate transfer of data remotely.

A HMI 416 may be utilized by a user and/or system to interact with the time series based semantic search system 414. Principles of the disclosure contemplate the manual, semi-automated, and/or automated operation of a time series based semantic search system 414, in part via the HMI 416 to accept and transmit information. A rule library 418 is a repository of operational rules created, generated, edited, and/or otherwise transacted by the semantic rules engine 408. These rules may be managed locally, remotely, or a combination of both. A cloud connectivity agent 420 is a supporting function of the time series based semantic search system 414 and assist in rule management with functions such as subscriptions, timers and/or the interactions with other components of time series based semantic search system 414. Additionally, the device data model library 422 is a repository of devices and capabilities available to the time series based semantic search system 414 via a gateway 428. It should be appreciated the device data model library 422 need not contain only devices currently in use by the time series based semantic search system 414, but may contain a complete library of functions for all available devices generally.

Figure 4C:
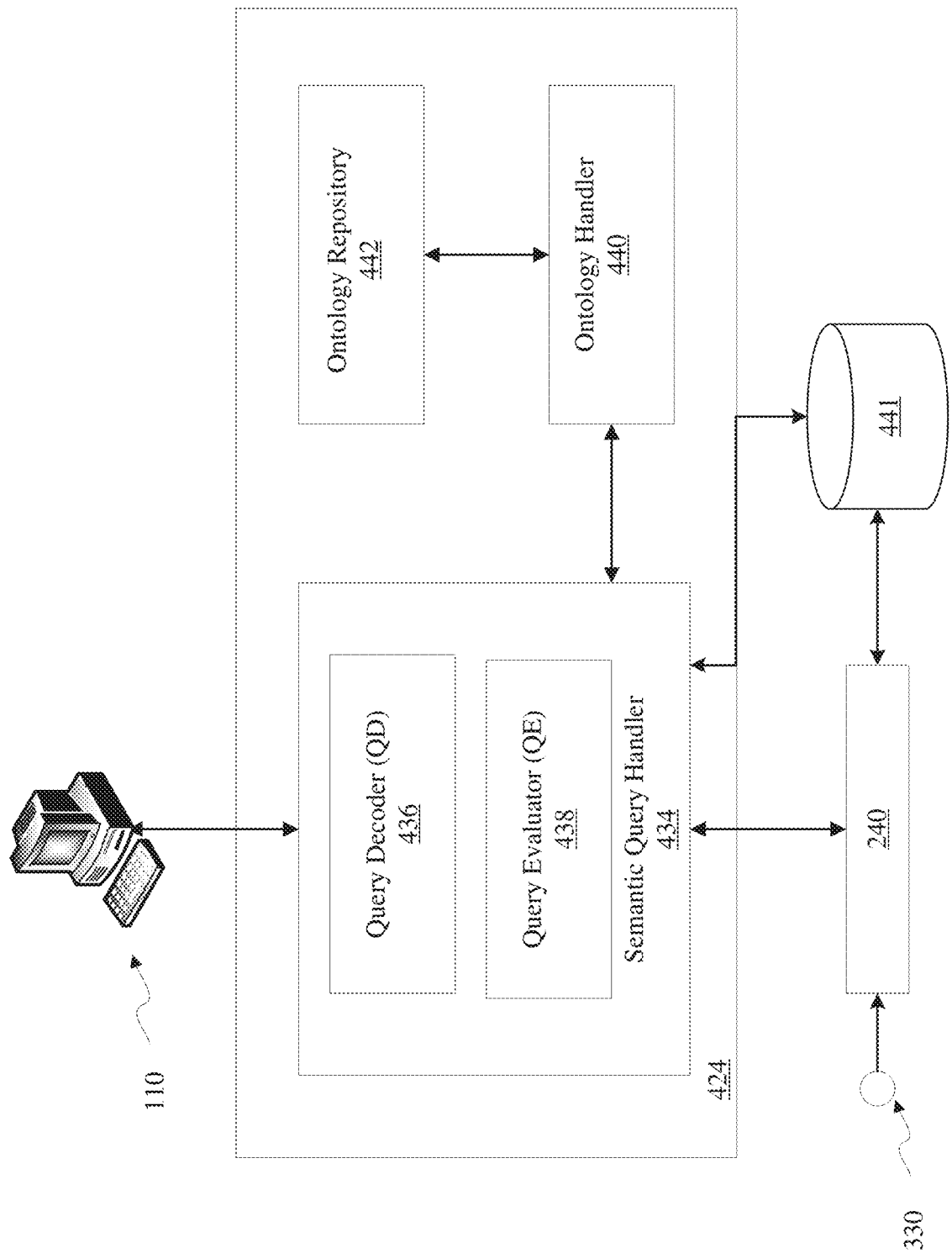
FIG. 4C is a block diagram of an embodiment of components of the system for a semantic search method utilizing time series data in accordance with various embodiments of this disclosure.

FIG. 4C is a block diagram of an embodiment of components of the system for a time series based semantic search system including detail of a semantic engine 424. It is possible for either a user and/or another process from a machine to begin a semantic search. A user-initiated search may begin at a general-purpose computer 110, in other implementations a machine-initiated process may derive from any other process in the system. It should be appreciated the methods of initiation of a semantic search are not mutually exclusive from each other. In both cases, the query processed by the semantic engine 424, is a structured search query with a particular grammar. This grammar structure may include the use of various data structure elements, filtering, basic aggregation, publish and subscribe, and inferential functions.

In one embodiment, a structured search query may include one or more filtering expressions. Search Device protocol:ZigBee and quantity:temperature and location: Lab101 With (name==TempSensor and value>22 and with unit==_F) will search for ZigBee wireless sensors in Lab 101 named "TempSensor" with values greater than 22F. In an alternate embodiment, basic aggregation functions are supported such as Min, Max, Sum, Avg. For example, Sum Variable measures:ActiveEnergy and usage:Lighting and location:Building2 calculates the sum of all active lighting sources in Building 2. In another embodiment, Publish and/or Subscribe functionalities, may be applied to connected elements in a specific location for a given measurement type. Subscribe Device protocol:zigbee and quantity: temperature and location: Floor1 with value>22 and with unit==_F every 00:10:00 from 2016-03-21 to 2016-04-21, analyses when particular connected elements become available. In another embodiment, inferential functions such as @type:sensor may be used to infer relationships between connected elements.

Structured search queries are received into Semantic Query Handler 434, which is composed of the Query Decoder (QD) 436 and the Query Evaluator (QE) 438. The Query Decoder (QD) 436 analyses the structured search query and deconstructs it into query elements. Query elements are passed to the Query Evaluator (QE) 438, to analyze the query elements and perform operations on the system based on the analysis. A structured search query may include an inferential function regarding a particular connected element. In this case the discrete connected element is not known, but information regarding same is requested. Here, further analysis is performed by the Ontology Handler 440, which further processes the data structure elements for the inferential reference contained in the structured search query and accesses the Ontology Repository 442 for the available inferential references to the appropriate connected elements.

For example, a connected element is a carbon dioxide sensor 330 queried by a user for the value of the environment. A user inputs a structured query into a general-purpose computer 110. The Query Decoder (QD) 436 decompiles the structured search query and passes the query elements to the Query Evaluator (QE) 438 that performs operations to collect the data. In this example, only the current value of carbon dioxide at the sensor 330 is requested. The Query Evaluator (QE) 438, requests the complete data structure for the connected element. This data structure is transmitted from the connected element acting as a gateway device 240 for the carbon dioxide sensor 330. The entire data structure of the carbon dioxide sensor 330 is collected from the connected element acting as a gateway device 240 and the data is transmitted to the Semantic Query Handler 434 and to the general-purpose computer 110. It should be appreciated that the data structures for analysis may be from near real time connected elements such as the connected element acting as a gateway device 240 or data repositories 441 which contain the data structures. Such decisions are based on state of the system and the structured search query. As described supra, the semantic engine 432, is one component of the time series based semantic search system 414 and is closely coupled with the rule engine described in FIG. 4D.

Figure 4D:
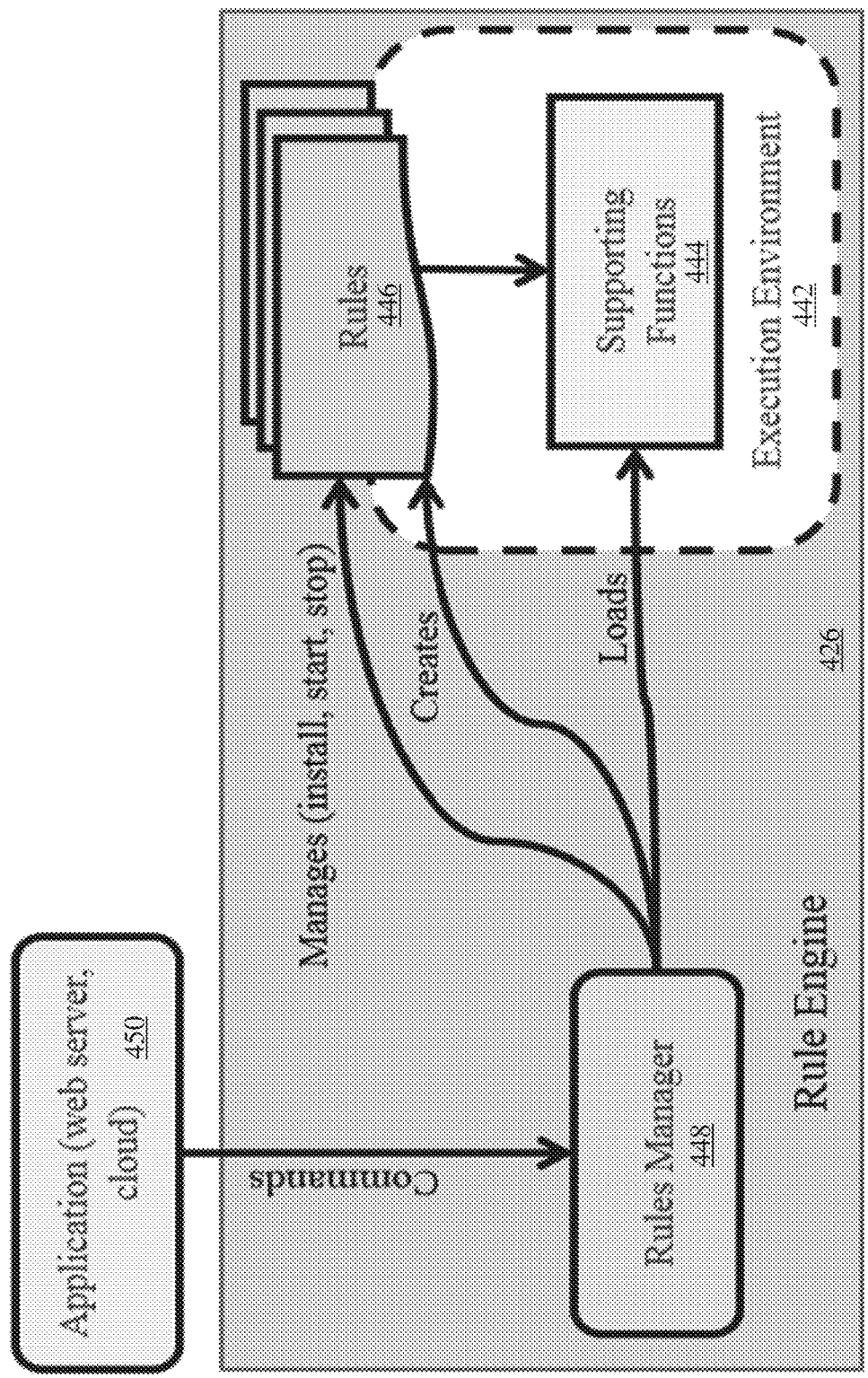
FIG. 4D is a block diagram of an embodiment of components of the system for a semantic search method utilizing time series data in accordance with various embodiments of this disclosure.

FIG. 4D is an example of an implementation of components of the system for a semantic search method in accordance with various embodiments of this disclosure. As described supra, the rules engine 426 is the other component of the semantic rules engine controller 408. It in part, provides gateway to connected elements with the decentralized intelligence and/or the ability to manage, monitor, and/or control any connected devices be it physical, virtual, or a combination of the two.

A rules manager module 448 may interact with the remote applications to receive rule files and/or commands to manage them. A rules manager loads the execution environment to run and manage all the rules. An execution environment is typically a set of supporting functions that are needs to provide the required functionality. These supporting functions 444 handle subscriptions, the timers and interactions with other components of semantic rule engine controller 408 such as the semantic engine 424 and cloud connectivity agent 420. Each of these functions may reside in an execution environment 442 to allow operation. Once the execution environment is created, the rules manager can create rules 446 and manage them (e.g. install, start, stop and/or delete). Each operational rule may be executed in isolation so that any anomalies with one rule does not affect others. Operational rules may interact with an application layer such as a web server or cloud 450 for enhanced remote capabilities. Such interaction may take the form of an HMI via a web page to issue instructions and/or commands to the time series based semantic search system 414.

In order to administer rules in a contextual basis, the semantic search engine 424, detailed supra, may be used. A concept of the semantic search engine 424 is utilized to allow the rule engine 426 to make semantic based queries and use returned results to execute rules. It should be appreciated, the linkage between the semantic search engine 424 and rule engine 426 are utilized to bring many of the benefits of this disclosure.

The provided simple query language greatly facilitates this interaction between the two Engines. This is a differentiating factor from other solutions such as If This Then That (IFTTT). As one of many examples, a rule may use a location tag as a means to obtain a list of sensors to make comparison of their current values against a threshold specified in a rule. A semantic search engine may do the filtering of all the sensors using the location tag and provides only the relevant ones to the Rules Engine as result. An operational rule may then do the comparison on any results and execute an action, for example, notification, alarm, and/or an actuation, according to the logic specified in the rule.

An alternate embodiment may be the same rule is executed periodically and before its next execution, some new sensors are installed in the same location. Use of a semantic engine will return both new and old sensors when executing the same semantic query in its next execution. Hence, there is no need to change the rule logic. In this example, the rule engine becomes independent of any topology change.

Overall, having this capability allows a semantic rule engine controller to become a flexible solution in which the same rules may be reused in different products and solutions as long as the concepts (such as location in above embodiment) are similar. This provides several benefits including but not limited to, time and cost savings, similar functionality irrespective of device, installation or customer.

Figure 5A:
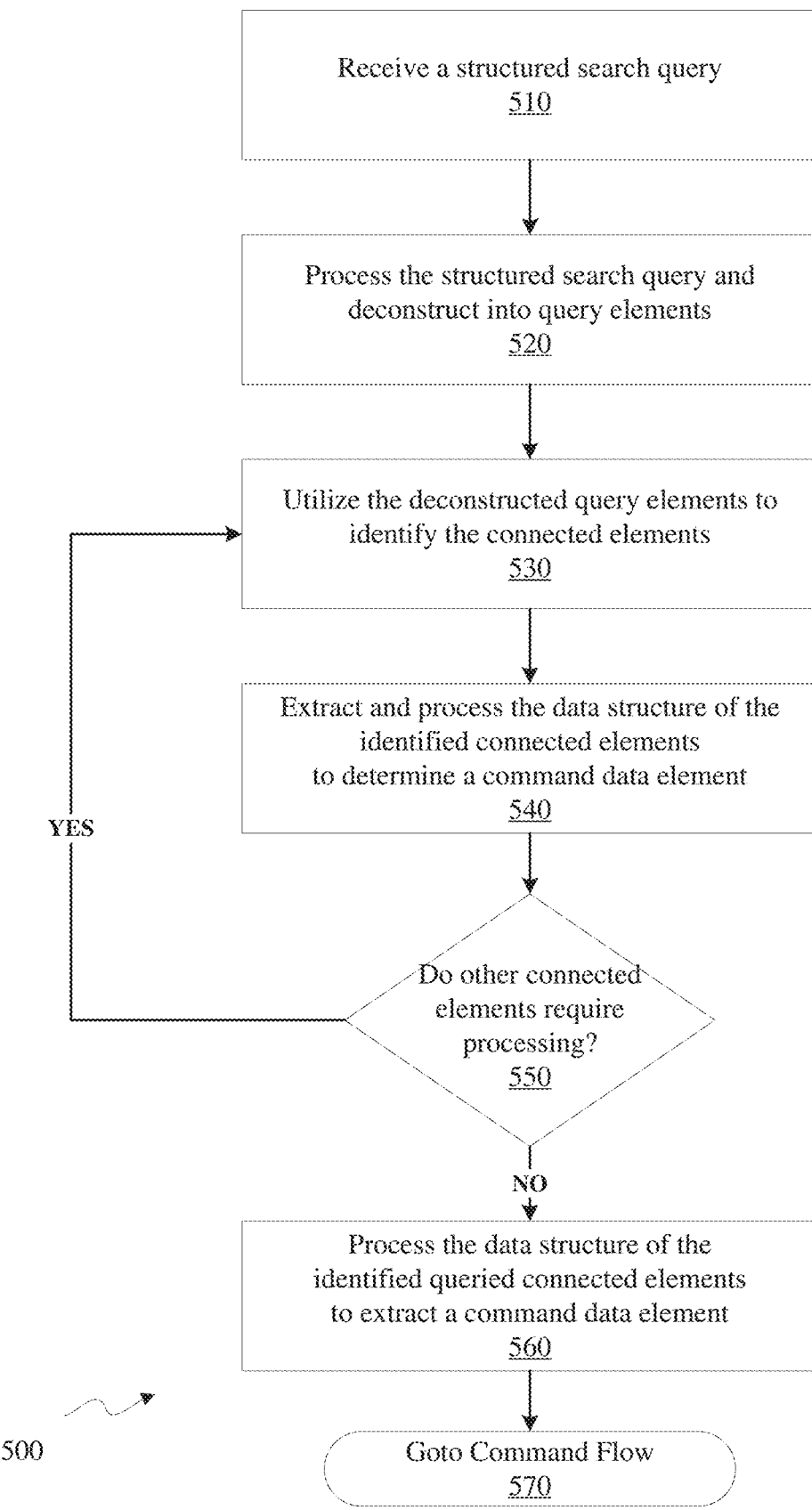
FIG. 5A is a flow diagram for executing a semantic search method utilizing time series data in accordance with various embodiments of this disclosure.

FIG. 5A is a flow diagram of a semantic search method 500 in accordance with various embodiments of this disclosure. As discussed supra, a structured search query is received for one or more connected elements 510. It should be appreciated that one or more connected elements may be the target of the semantic search. This query is received directly from a user or another machine. One received, the structured search query is deconstructed into its composite query elements 520. Query elements are processed by the Semantic Search Engine to identify which of the connected elements require examination of their respective data structure 530. The data structure for each identified connected element extracted and processed to determine what data structured elements match the query elements of the structured search query and to determine a command data element 540. This command data element is used to determine additional processing required to complete the structured search query. Embodiments of the disclosure allow for analysis of multiple data structure elements of multiple data structures, which correspond to multiple connected elements. Decisions are made to determine if other processing is necessary 550. If not, processing is performed for the data structure on each identified connected element to determine the command data element for each identified connected element 560. Commands are then separated by type 570.

Figure 5B:
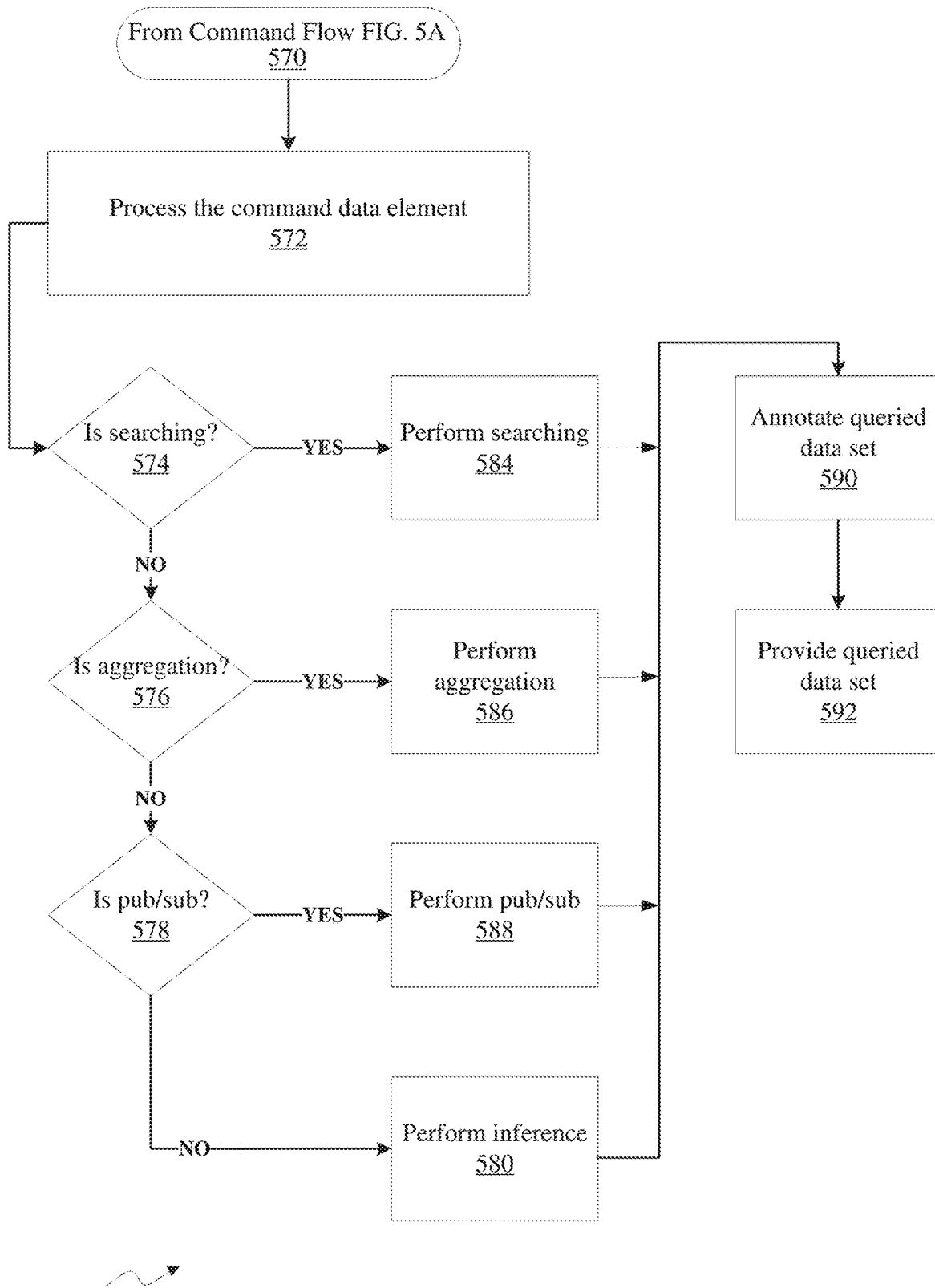
FIG. 5B is a flow diagram of exemplary command functions for a method for a semantic search method utilizing time series data.

FIG. 5B is a flow diagram of exemplary command functions for a method for a semantic search method. From FIG. 5A commands are separated by type 570. Command data is processed to determine further processing. These types include searching commands 574, aggregation commands 576, publishing and subscription commands 578, and localized inference commands. Once the determination is made, the command is carried out for searching 584, aggregation 586, publishing and subscription 588, and localized inference 580. Once the result of processing the commands is complete for all identified connected elements, annotation of the data is performed to form a queried data set 590. This queried data set is the result of the initial query along with any actions taken as part of the commands processed. This queried data set is provided 592 to the general-purpose computer to be used by the user and/or the system that made the initial query.

Figure 6A:
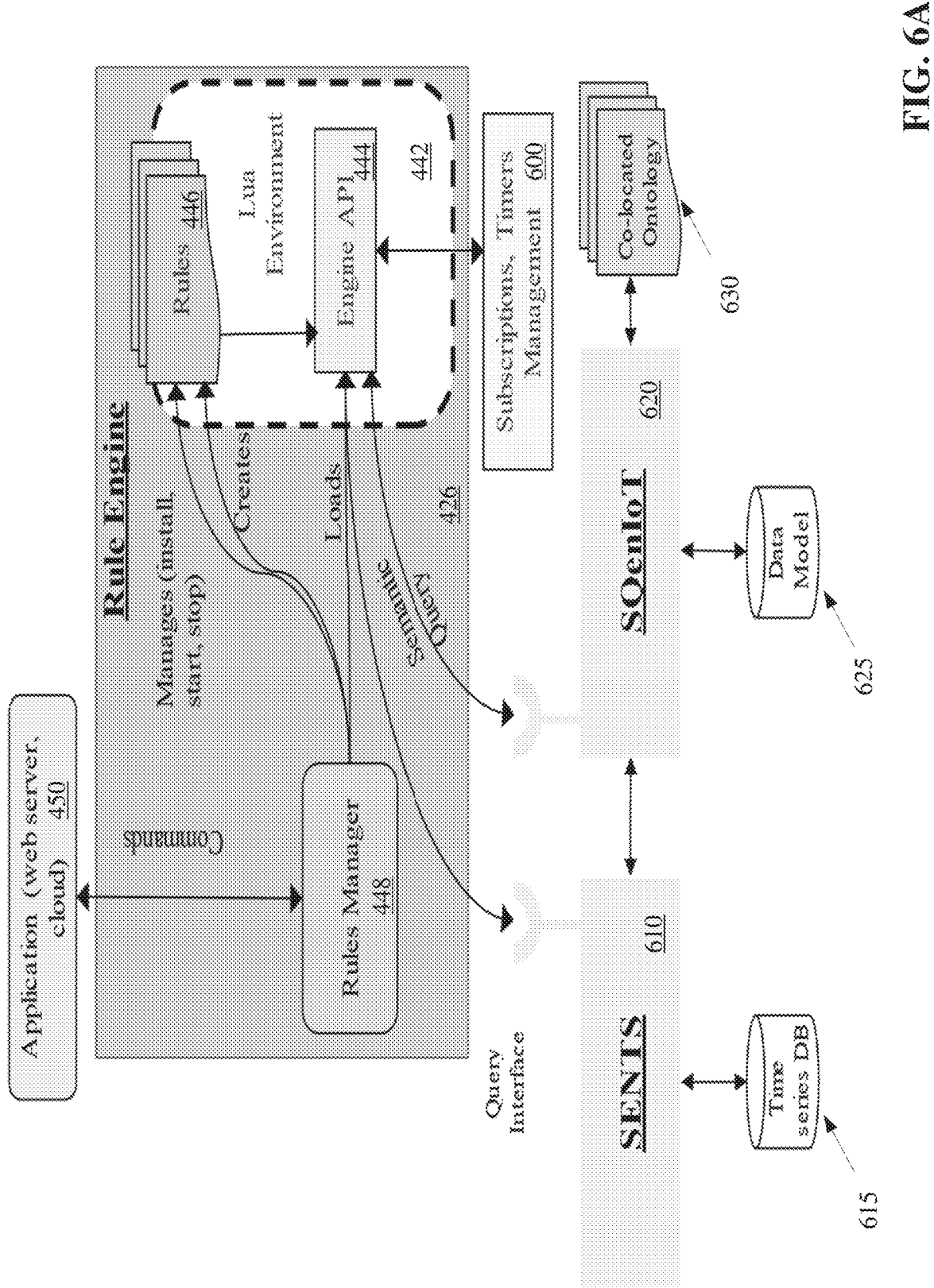
FIG. 6A represents aspects of a system for facilitating a system for a semantic search method utilizing time series data in accordance with various embodiments of this disclosure.

FIG. 6A represents aspects of a system for facilitating a system for a timer series based semantic search method in accordance with various embodiments of this disclosure. Elements of an embodiment may include a semantic rule engine 426 and variations of associated components, one or more web server or cloud 450 for enhanced remote capabilities, and a series of functions to facilitate subscriptions, timers, and/or management of various associated rules.

A rules engine 426 may also interact with a semantic engine specific to time series data. In various implementations these may be called a Semantic Engine for Time Series (SENTS) 610 or an Embedded version of embodiments of this engine (ESENTS). Associated with SENTS 610 is one or more repositories of time series data 615. This data may be associated with a wide array of sources and applications. Sensor data such as wind speed, temperature, door contact closure, etc. are all potential examples of such time series data. Of note is that each event, without regard to what the event is, is associated with or can be associated with a temporal signature.

Implementations of SENTS 610 queries may rely on domain specific query language and may consider a combination of tags and/or expressions to filter and aggregate time series data using several dimensions such as, but not limited to semantic context, static attributes, values, and/or time ranges. SENTS query language supports at least two types of queries, Values Queries and Time Ranges Queries. It should be appreciated that others are possible based on the particular application.

Values Queries are supported by various timeseries engines to search and aggregate historical sensor data. SENTS 610 may provide data filtering based on semantic tags, static attributes, values, composite time, and/or the time ranges. Time Ranges queries may retrieve the time ranges when multiple conditions are met continuously for a given period of time. For example, with queries of this type it is possible to find time ranges when an air conditioner was ON for 2 hours without interruption. Application of such queries are a differentiating factor of SENTS 610 compared to existing time series database management.

Figure 6B:
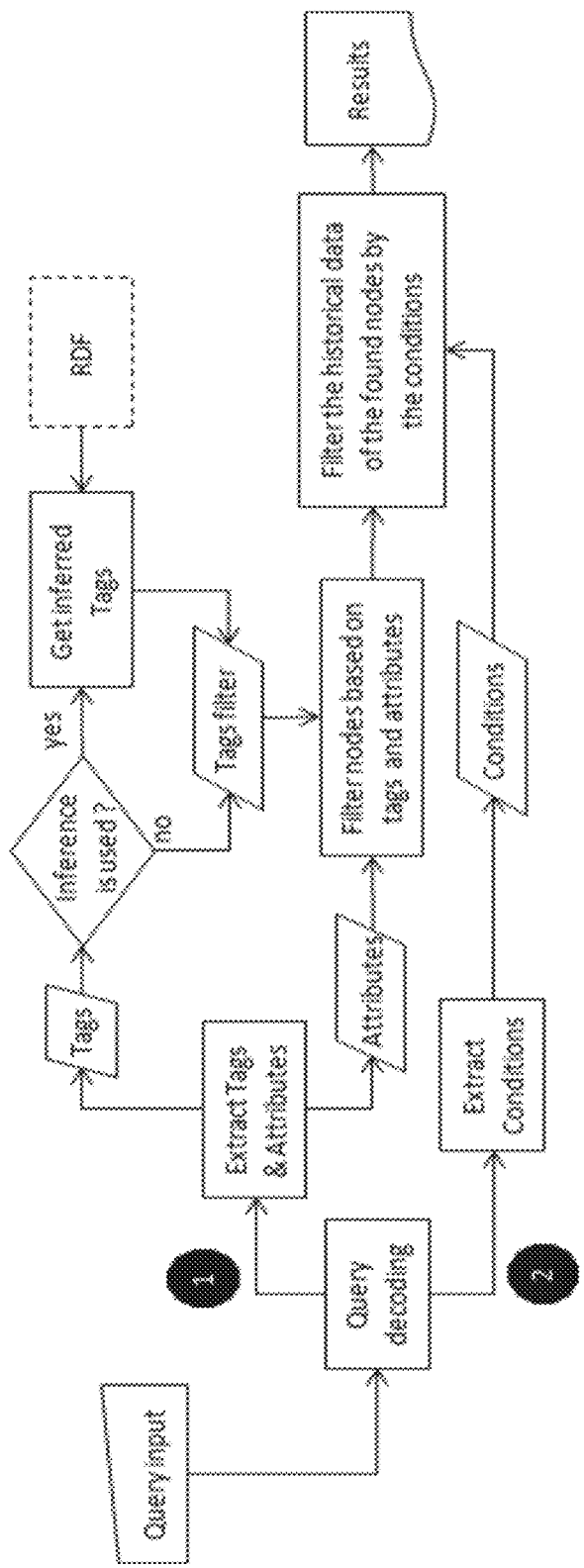
FIG. 6B represents a flow diagram of aspects of a method for a semantic search method utilizing time series data in accordance with various embodiments of this disclosure.

Referring to the flow diagram of FIG. 6B, when a SENTS 610 query is received, the timeseries query decoder may generate an Abstract Syntax Tree (AST) and splits it in two parts to be handled by the Nodes Filter (1) or the Data Filter (2).

A Nodes Filter consists of a list of tags (TAGS_FILTER) and static attributes (ATTRIBUTES_FILTER) as conditions, such tags may be assigned to the sensors, devices, or other associated points during the commissioning phase and/or during runtime when a device is added to the network. The assigned tags may be used to identify the sensors, devices, or other associated points producing the timeseries data. For example the query: Search values usage: Temperature and (location:Floor1 or location:Floor2), returns all the past data of temperature sensors tagged with semantic context (e.g. location Floor1 or Floor2). SENTS 610 embodiments also supports the static attributes: unit, name, id, while the tags are extracted from the deployed ontology used during commissioning.

Data Filter is the other part of the query which contains the conditions to filter the past data of the devices retrieved by the Nodes Filter. At least four conditions types are defined: 1) VALUE FILTER to filter data with conditions on the value. Embodiments consists of comparing each TS value to one or more numbers using comparison operators f<, <=, >, >=, ==, !=g. DURATION FILTER may be available only for Time Ranges queries, it filters the time ranges by the uninterrupted duration when the query conditions are met. TIME_FILTER to make conditions on the composite time, such as: year, month, may, week day, hours, minutes and seconds. TIME_RANGE_FILTER to limit the analysis of data to a specific time range slot, expressed by starting and ending times.

An Ontology Handler 630 is also contemplated. Such a handler supports an interface between SENTS 610 and a Semantic Query engine for the Internet of Things (SQenIoT) 620. Embodiments of SENTS 610 and SQenIoT 620 support and inference to the Ontology Handler 630. Similar to the time series data repository 615 associated with embodiments of a SENTS 610, a data model repository 625 which may store ontological models, is associated with embodiments of a SQenIoT 620.

Embodiments of the Ontology Handler 630 may utilize the deployed ontologies on the gateway or other associated device to infer additional knowledge. Inference is a contemplated feature in the queries by prefixing the filter tags with the inference Various beneficial features are associated with an SENTS 610. These include, but are not limited to, Aggregation Functions such as AVG, MIN, MAX, SUM and COUNT. Detection of past events based on an event of predefined conditions on the values of one or more devices, or/and on the time stamps. Parallel and independent event detection where two or more time range queries can be used detect independent or parallel events with the union of queries and nested queries respectively. Union of queries between two or more Time Ranges queries, SENTS can detect independent events.

In one embodiment, SENTS is implemented in C and is independent of any data store. Various data stores are contemplated in embodiments of this disclosure including, Binary, Sqlite, InfluxDb and a hybrid solution comprising of Sqlite and Binary data stores.

In another embodiment, Lua was selected due to the following factors: (1) Lua has been developed for embedded systems; (2) Lua is open source and has a strong user base; (3) Lua syntax may be understood by non-technical users of a system; (4) Lua allows a wide range of expressions; (5) Lua has lightweight open source interpreters in many languages including Java and C thereby facilitating integration within different products.

In this embodiment, a rule may be written as a Lua script which is then executed by the Lua interpreter. Both Java and C versions of rule engine were developed for different hardware platforms offering similar functionality. Supporting functions may include a list of Java or C functions to provide support for subscriptions and timers for execution of rules. An execution environment may be created by the Lua interpreter and ensures that multiple rules do not interfere with each other during their execution.

Lua also allows a rule to call a normal Java or C function whose actual implementation has been done in a Java method or C function. Additional features may be supported by SRE through these implementations and rules can simple call these functions accordingly.

The implementation of Semantic Engine in SRE is also shown in FIG. 6. Similar to the Rule Engine, it may be also developed in both Java and C languages. The rules may be able to send a semantic search query to the query interface of the semantic search engine. Functions may be provided by the Engine API module.

In another embodiment, a Java version of SRE was deployed on a commercial off-the-shelf industrial gateway device which is able to connect to variety of devices and remote cloud platforms using the Modbus1, Ethernet, Wi-Fi and/or GPRS interfaces, among others. A gateway may use Linux OS with IBM J9 as Java Virtual Machine (JVM). J9 is specific for embedded systems and has been certified for industrial usage. ProSyst2 implementation of Open Service Gateway initiative (OSGi) is a framework used over J9 to facilitate modular design of the software components running over ProSyst2. SRE may be implemented as one such component.

In yet another embodiment, the C version of SRE is implemented for a different hardware platform which is based on dual core Cortex A9 chip clocked at 900 Mhz with 1 GB RAM. It should be appreciated other hardware platforms may be used. SRE may also run Linux4 for embedded systems. Connectivity options include, but are not limited to, ZigBee, Ethernet, Bluetooth and/or Wi-Fi. SRE may be developed as a POSIX compliant library that may be imported to other client application projects.

Any general-purpose computer systems used in various embodiments of this disclosure may be, for example, general-purpose computers such as those based on Intel PENTIUM-type processor, Motorola PowerPC, Sun UltraSPARC, Hewlett-Packard PA-RISC processors, or any other type of processor.

Figure 7:
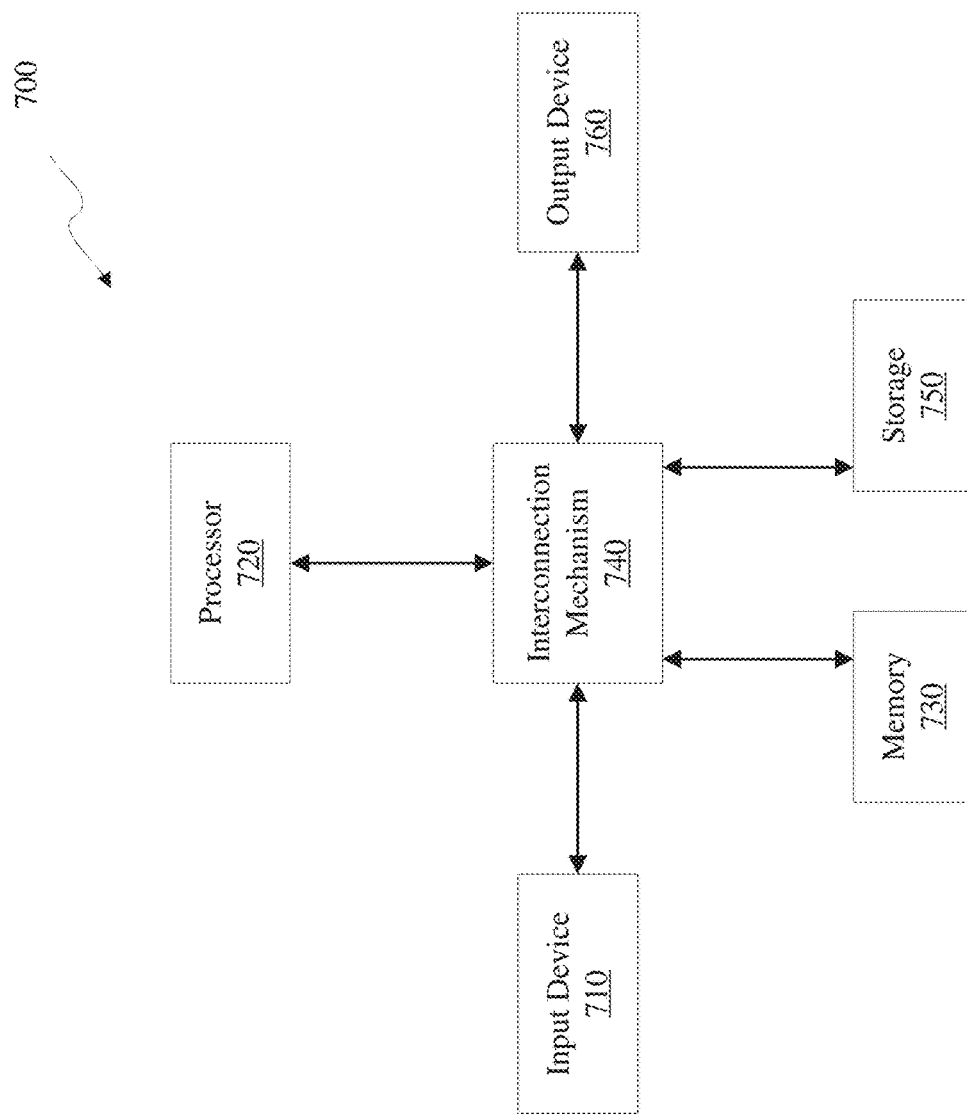
FIG. 7 is a functional block diagram of a general-purpose computer system in accordance with embodiments of this disclosure.

For example, various embodiments of the disclosure may be implemented as specialized software executing in a general-purpose computer system 700 such as that shown in FIG. 7. The computer system 700 may include a processor 720 connected to one or more memory devices 730, such as a disk drive, memory, or other device for storing data. Memory 730 is typically used for storing programs and data during operation of the computer system 700. The computer system 700 may also include a storage system 750 that provides additional storage capacity. Components of computer system 700 may be coupled by an interconnection mechanism 740, which may include one or more busses (e.g., between components that are integrated within the same machine) and/or a network (e.g., between components that reside on separate discrete machines). The interconnection mechanism 740 enables communications (e.g., data, instructions) to be exchanged between system components of system 700.

Computer system 700 also includes one or more input devices 710, for example, a keyboard, mouse, trackball, microphone, touch screen, and one or more output devices 760, for example, a printing device, display screen, speaker. In addition, computer system 700 may contain one or more interfaces (not shown) that connect computer system 700 to a communication network (in addition or as an alternative to the interconnection mechanism 740).

The storage system 750, shown in greater detail in FIG. 8, typically includes a computer readable and writeable nonvolatile recording medium 810 in which signals are stored that define a program to be executed by the processor or information stored on or in the medium 810 to be processed by the program to perform one or more functions associated with embodiments described herein. The medium may, for example, be a disk or flash memory. Typically, in operation, the processor causes data to be read from the nonvolatile recording medium 810 into another memory 820 that allows for faster access to the information by the processor than does the medium 810. This memory 820 is typically a volatile, random access memory such as a dynamic random-access memory (DRAM) or static memory (SRAM). It may be located in storage system 800, as shown, or in memory system 730. The processor 720 generally manipulates the data within the integrated circuit memory 730, 820 and then copies the data to the medium 810 after processing is completed. A variety of mechanisms are known for managing data movement between the medium 810 and the integrated circuit memory element 730, 820, and the disclosure is not limited thereto. The disclosure is not limited to a particular memory system 730 or storage system 750.

The computer system may include specially-programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the computer system described above or as an independent component.

Although computer system 700 is shown by way of example as one type of computer system upon which various aspects of the disclosure may be practiced, it should be appreciated that aspects of the disclosure are not limited to being implemented on the computer system as shown in FIG. 8. Various aspects of the disclosure may be practiced on one or more computers having a different architecture or components shown in FIG. 8. Further, where functions or processes of embodiments of the disclosure are described herein (or in the claims) as being performed on a processor or controller, such description is intended to include systems that use more than one processor or controller to perform the functions.

Computer system 700 may be a general-purpose computer system that is programmable using a high-level computer programming language. Computer system 700 may be also implemented using specially programmed, special purpose hardware. In computer system 700, processor 720 is typically a commercially available processor such as the well-known Pentium class processor available from the Intel Corporation. Many other processors are available. Such a processor usually executes an operating system which may be, for example, the Windows 95, Windows 98, Windows NT, Windows 2000, Windows ME, Windows XP, Vista, Windows 7, Windows 10, or progeny operating systems available from the Microsoft Corporation, MAC OS System X, or progeny operating system available from Apple Computer, the Solaris operating system available from Sun Microsystems, UNIX, Linux (any distribution), or progeny operating systems available from various sources. Many other operating systems may be used.

The processor and operating system together define a computer platform for which application programs in high-level programming languages are written. It should be understood that embodiments of the disclosure are not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C # (C-Sharp). Other object-oriented programming languages may also be used. Alternatively, functional, scripting, and/or logical programming languages may be used, such as BASIC, ForTran, COBoL, TCL, or Lua. Various aspects of the disclosure may be implemented in a non-programmed environment (e.g., documents created in HTML, XML or other format that, when viewed in a window of a browser program render aspects of a graphical-user interface (GUI) or perform other functions). Various aspects of the disclosure may be implemented as programmed or non-programmed elements, or any combination thereof.

Embodiments of a systems and methods described above are generally described for use in relatively large data centers having numerous equipment racks; however, embodiments of the disclosure may also be used with smaller data centers and with facilities other than data centers such as office spaces, industrial buildings, manufacturing lines, and/or other that may utilize devices to aggregate time series data. Some embodiments may also be a very small number of computers distributed geographically so as to not resemble a particular architecture.

In embodiments of the present disclosure discussed above, results of analyses are described as being provided in real-time. As understood by those skilled in the art, the use of the term real-time is not meant to suggest that the results are available immediately, but rather, are available quickly giving a designer the ability to try a number of different designs over a short period of time, such as a matter of minutes.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

The invention claimed is:

1. A method of processing a time series semantic search query, comprising:
receiving a structured search query with a particular grammar, wherein the particular grammar includes a combination of tags or expressions including at least one of semantic context, static attributes, values, and time ranges, wherein the structured search query includes an inferential function for use in identifying connected elements relating to elements of the structured search query;
deconstructing the structured search query into one or more query elements including at least one query condition;
identifying one or more connected elements corresponding to the one or more query elements;
determining, by an ontology handler, a plurality of inferential references within an ontology from an ontology repository using a Resource Description Framework (RDF) schema;
identifying one or more inferred connected elements corresponding to the plurality of inferential references;
processing a data structure of each of the identified one or more connected elements and the one or more inferred connected elements to determine a time series data structure meeting the at least one query condition;
processing the time series data structure of each of the identified one or more connected elements to and the one or more inferred connected elements form a queried data set; and
providing the queried data set for further action.

2. The method of claim 1, wherein the particular grammar includes query elements that facilitate at least one of (i) filtering, (ii) aggregation, (iii) publish, (iv) subscribe, or (v) inferential functions, and the method further comprising:
prior to providing the queried data set for further action, processing the queried data set using the particular grammar by performing at least one of a filtering operation, an aggregation operation, a publish operation, a subscribe operation or an inferential operation on the queried data set to produce a processed data set, wherein the processed data set is provided for further action.

3. The method of claim 1, wherein a defined data source is filtered for a data field associated with the one or more connected elements.

4. The method of claim 3, wherein the data field associated with the one or more connected elements is selected from a group including device type, class, capability, or communication protocol.

5. The method of claim 1, wherein a defined data source is aggregated using a mathematical operation.

6. The method of claim 5, wherein the mathematical operations include min, max, sum, or average.

7. The method of claim 5, wherein the defined data source is published or subscribed for connected elements.

8. The method of claim 5, wherein the defined data source infers relationships between connected elements.

9. The method of claim 8, wherein inferring relationships between connected elements is determined by time series operations.

10. A system of processing a time series semantic search query, comprising:
a processor configured to:
receive a structured search query with a particular grammar, wherein the particular grammar includes a combination of tags or expressions including semantic context, static attributes, values, and time ranges, wherein the structured search query includes an inferential function for use in identifying connected elements relating to elements of the structured search query;
deconstruct the structured search query into one or more query elements including at least one query condition;
identify one or more connected elements corresponding to the one or more query elements;
determine, by an ontology handler, a plurality of inferential references within an ontology from an ontology repository using a Resource Description Framework (RDF) schema;
identify one or more inferred connected elements corresponding to the plurality of inferential references;
process a data structure of each of the identified one or more connected elements and the one or more inferred connected elements to determine a time series data structure meeting the at least one query condition;
process the time series data structure of each of the identified one or more connected elements to and the one or more inferred connected elements form a queried data set; and
provide the queried data set for further action.

11. The system of claim 10, wherein the particular grammar includes query elements that facilitate at least one of (i) filtering, (ii) aggregation, (iii) publish, (iv) subscribe, or inferential functions, and the method further comprising:
prior to providing the queried data set for further action, processing the queried data set using the particular grammar by performing at least one of a filtering operation, an aggregation operation, a publish operation, a subscribe operation or an inferential operation on the queried data set to produce a processed data set, wherein the processed data set is provided for further action.

12. The system of claim 10, wherein a defined data source is filtered for a data field associated with the one or more connected elements.

13. The system of claim 12, wherein the data field associated with the one or more connected elements is selected from a group including device type, class, capability, or communication protocol.

14. The system of claim 10, wherein a defined data source is aggregated using a mathematical operation.

15. The system of claim 14, wherein the mathematical operations include min, max, sum, or average.

16. The system of claim 14, wherein the defined data source is published or subscribed for connected elements.

17. The system of claim 14, wherein the defined data source infers relationships between connected elements.

18. The system of claim 17, wherein inferring relationships between connected elements is determined by time series operations.

\* \* \* \* \*